US012436646B2

United States Patent
Song et al.

(10) Patent No.: US 12,436,646 B2
(45) Date of Patent: Oct. 7, 2025

(54) DISPLAY DEVICE INCLUDING FIRST DRIVER OPERATING AT FIRST OPERATING FREQUENCY AND SECOND DRIVER OPERATING AT SECOND OR THIRD OPERATING FREQUENCY

(71) Applicant: Samsung Display Co., Ltd., Yongin-si (KR)

(72) Inventors: Heerim Song, Yongin-si (KR); Cheol-Gon Lee, Yongin-si (KR); Mukyung Jeon, Yongin-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 18/361,427

(22) Filed: Jul. 28, 2023

(65) Prior Publication Data
US 2024/0111381 A1 Apr. 4, 2024

(30) Foreign Application Priority Data
Sep. 30, 2022 (KR) .................. 10-2022-0125477

(51) Int. Cl.
*G06F 3/041* (2006.01)
*G06V 40/13* (2022.01)
*G09G 3/3266* (2016.01)

(52) U.S. Cl.
CPC ...... *G06F 3/04184* (2019.05); *G06V 40/1318* (2022.01); *G09G 3/3266* (2013.01); *G09G 2300/0426* (2013.01); *G09G 2300/0452* (2013.01); *G09G 2310/0251* (2013.01); *G09G 2310/08* (2013.01); *G09G 2354/00* (2013.01)

(58) Field of Classification Search
CPC ........ B60G 2204/41; B60G 2204/4104; B60G 2204/44; B60G 2204/4404; G06F 3/04184; G06V 40/1318; G09G 2300/0426; G09G 2300/0452; G09G 2310/0251; G09G 2310/08; G09G 2354/00; G09G 3/20; G09G 3/3233; G09G 3/3266
See application file for complete search history.

(56) References Cited

U.S. PATENT DOCUMENTS

| 10,482,825 | B2 | 11/2019 | Kim |
| 11,113,499 | B2 | 9/2021 | Jung et al. |
| 11,158,258 | B2 * | 10/2021 | Cha ............... G06V 40/1318 |
| 11,262,867 | B2 | 3/2022 | Fujisawa et al. |
| 2012/0182277 | A1 * | 7/2012 | Jeong ............... G06F 3/0412 345/207 |

(Continued)

FOREIGN PATENT DOCUMENTS

| JP | 2021-157689 A | 10/2021 |
| KR | 10-2020-0022060 A | 3/2020 |
| KR | 10-2021-0064483 A | 6/2021 |

*Primary Examiner* — Chun-Nan Lin
(74) *Attorney, Agent, or Firm* — Womble Bond Dickinson (US) LLP

(57) ABSTRACT

A display device includes: a pixel, a sensor, a first driver, and a second driver. The pixel includes a pixel driving circuit and a light emitting element. The sensor includes a sensor driving circuit and a sensing element. The first driver outputs a first scan signal to the pixel driving circuit, and the second driver outputs a second scan signal to the sensor driving circuit. The first driver is to operate at a first operating frequency, and the second driver is to operate at a second operating frequency or a third operating frequency.

19 Claims, 22 Drawing Sheets

(56) References Cited

U.S. PATENT DOCUMENTS

| | | | |
|---|---|---|---|
| 2021/0158751 A1* | 5/2021 | Cha | H10K 65/00 |
| 2022/0344409 A1* | 10/2022 | Lee | G09G 3/3233 |
| 2023/0098891 A1* | 3/2023 | Song | G09G 3/3233 |
| | | | 345/207 |

* cited by examiner

[First Sensing Mode]

[Second Sensing Mode]

[Second Sensing Mode]

DISPLAY DEVICE INCLUDING FIRST DRIVER OPERATING AT FIRST OPERATING FREQUENCY AND SECOND DRIVER OPERATING AT SECOND OR THIRD OPERATING FREQUENCY

CROSS-REFERENCE TO RELATED APPLICATIONS

This application claims priority to and the benefit of Korean Patent Application No. 10-2022-0125477, filed on Sep. 30, 2022, in the Korean Intellectual Property Office, the entire disclosure of which is incorporated by reference herein.

BACKGROUND

Aspects of embodiments of the present disclosure relate to a display device capable of biometric information recognition and touch recognition.

A display device provides various functions to provide information to a user by displaying an image, or to communicate organically with the user, such as detecting a user input. Recently, display devices include a function to detect the user's biometric information. Biometric information recognition schemes include a capacitive scheme that detects a change in capacitance between electrodes, an optical scheme that detects incident light by using an optical sensor, and an ultrasonic scheme that detects vibration by using a piezoelectric material or the like.

The above information disclosed in this Background section is for enhancement of understanding of the background of the present disclosure, and therefore, it may contain information that does not constitute prior art.

SUMMARY

Embodiments of the present disclosure are directed to a display device capable of both biometric information recognition and touch recognition by using a sensor.

According to one or more embodiments of the present disclosure, a display device includes: a pixel including a pixel driving circuit and a light emitting element; a sensor including a sensor driving circuit and a sensing element; a first driver configured to output a first scan signal to the pixel driving circuit; and a second driver configured to output a second scan signal to the sensor driving circuit. The first driver is configured to operate at a first operating frequency, and the second driver is configured to operate at a second operating frequency or a third operating frequency.

In an embodiment, the first driver may include a plurality of first driving stages, the second driver may include a plurality of second driving stages and a plurality of switch circuits, and each of the plurality of switch circuits may be configured to control delivery of a first clock signal of the second operating frequency or a second clock signal of the third operating frequency.

In an embodiment, each of the plurality of switch circuits may include: a first switch connected to a first clock line to be provided with the first clock signal, and configured to be controlled by a first enable signal; and a second switch connected to a second clock line to be provided with the second clock signal, and configured to be controlled by a second enable signal.

In an embodiment, in a first sensing mode for sensing a fingerprint, the first enable signal may be activated, and the second enable signal may be deactivated, and in a second sensing mode for sensing an external input, the first enable signal may be deactivated, and the second enable signal may be activated.

In an embodiment, the number of the plurality of second driving stages may be greater than the number of the plurality of switch circuits.

In an embodiment, the plurality of second driving stages may be sequentially located along a first direction. The plurality of switch circuits may include: a first switch circuit connected to an X-th second driving stage from among the plurality of second driving stages; a second switch circuit connected to an (X+N)-th second driving stage from among the plurality of second driving stages; and a third switch circuit connected to an (X+2N)-th second driving stage from among the plurality of second driving stages, and X may be a constant and N may be a constant.

In an embodiment, the number of the plurality of second driving stages may be equal to the number of the plurality of switch circuits, and the plurality of second driving stages may be connected to the plurality of switch circuits, respectively.

In an embodiment, in the second sensing mode, the first enable signal may be deactivated, and the second enable signal may be activated during a section during which (X+(y*N))-th second driving stages from among the plurality of second driving stages are to operate, and X may be a constant, N may be a constant, and y may be an integer greater than or equal to 0.

In an embodiment, the first driver may include a plurality of first driving stages, and the second driver may include a plurality of second driving stages. The plurality of second driving stages may include: a plurality of first sensing driving stages configured to receive a first clock signal of the second operating frequency; and a plurality of second sensing driving stages configured to receive a second clock signal of which a frequency is changed to the second operating frequency or the third operating frequency.

In an embodiment, at least one first sensing driving stage from among the plurality of first sensing driving stages may be located between two second sensing driving stages closest to each other from among the plurality of second sensing driving stages.

In an embodiment, the number of the plurality of first sensing driving stages may be greater than the number of the plurality of second sensing driving stages.

In an embodiment, the first driver may include a plurality of first driving stages, the second driver may include a plurality of second driving stages, and each of the plurality of second driving stages may be configured to receive a clock signal of which a frequency is changed to the second operating frequency or the third operating frequency.

In an embodiment, the first driver may include a plurality of first driving stages, the second driver may include a plurality of second driving stages, and a plurality of switch circuits respectively connected to the plurality of second driving stages, and the plurality of switch circuits may be configured to selectively output one of the first scan signal output from the plurality of first driving stages or the second scan signal output from the plurality of second driving stages.

In an embodiment, the number of the plurality of first driving stages may be greater than the number of the plurality of second driving stages.

In an embodiment, the number of the plurality of first driving stages may be equal to the number of the plurality of second driving stages.

In an embodiment, in a first sensing mode for sensing a fingerprint, the plurality of switch circuits may be configured to deliver the first scan signal output from the plurality of first driving stages, and in a second sensing mode for sensing an external input, the plurality of switch circuits may be configured to deliver the second scan signal output from the plurality of second driving stages.

In an embodiment, in a first sensing mode for sensing a fingerprint, the plurality of switch circuits may be configured to deliver the first scan signal output from the plurality of first driving stages, and in a second sensing mode for sensing an external input, the plurality of switch circuits may be configured to deliver the second scan signal output from some second driving stages from among the plurality of second driving stages.

In an embodiment, the first driver may include a plurality of first driving stages, and the second driver may include a plurality of second driving stages. The plurality of first driving stages may be spaced from one another along a first direction, and the plurality of second driving stages may be spaced from one another along the first direction. The first driver and the second driver may be spaced from each other in a second direction crossing the first direction.

In an embodiment, the first driver may include a plurality of first driving stages, the second driver may include a plurality of second driving stages, the plurality of first driving stages may be spaced from one another in a first direction, and the plurality of second driving stages may be spaced from one another in the first direction. The plurality of second driving stages may be respectively located in a plurality of spaces defined between the plurality of first driving stages.

According to one or more embodiments of the present disclosure, a display device includes: a base layer; a circuit layer on the base layer; and an element layer on the circuit layer, and including a light emitting element and a sensing element. The circuit layer includes: a pixel driving circuit connected to the light emitting element; a sensor driving circuit connected to the sensing element; a first driver configured to operate at a first operating frequency; and a second driver configured to operate at a second operating frequency or a third operating frequency. The sensor driving circuit is configured to: receive a first scan signal according to the second operating frequency to operate in a first sensing mode for sensing a fingerprint, or receive a second scan signal according to the third operating frequency to operate in a second sensing mode for sensing an external input.

In an embodiment, the first driver may include a plurality of first driving stages, the second driver may include a plurality of second driving stages and a plurality of switch circuits, and each of the plurality of switch circuits may be configured to control delivery of a first clock signal of the second operating frequency or a second clock signal of the third operating frequency.

In an embodiment, the number of the plurality of switch circuits may be less than or equal to the number of the plurality of second driving stages.

In an embodiment, the first driver may include a plurality of first driving stages, and the second driver may include a plurality of second driving stages. The plurality of second driving stages may include: a plurality of first sensing driving stages configured to receive a first clock signal of the second operating frequency; and a plurality of second sensing driving stages configured to receive a second clock signal of which a frequency is changed to the second operating frequency or the third operating frequency.

In an embodiment, the first driver may include a plurality of first driving stages, the second driver may include a plurality of second driving stages, and each of the plurality of second driving stages may be configured to receive a clock signal of which a frequency is changed to the second operating frequency or the third operating frequency.

In an embodiment, the first driver may include a plurality of first driving stages, the second driver may include a plurality of second driving stages, and a plurality of switch circuits respectively connected to the plurality of second driving stages, and the plurality of switch circuits may be configured to selectively output one of the first scan signal output from the plurality of first driving stages or the second scan signal output from the plurality of second driving stages.

BRIEF DESCRIPTION OF THE FIGURES

The above and other aspects and features of the present disclosure will be more clearly understood from the following detailed description of the illustrative, non-limiting embodiments with reference to the accompanying drawings.

DETAILED DESCRIPTION

Figure 1:
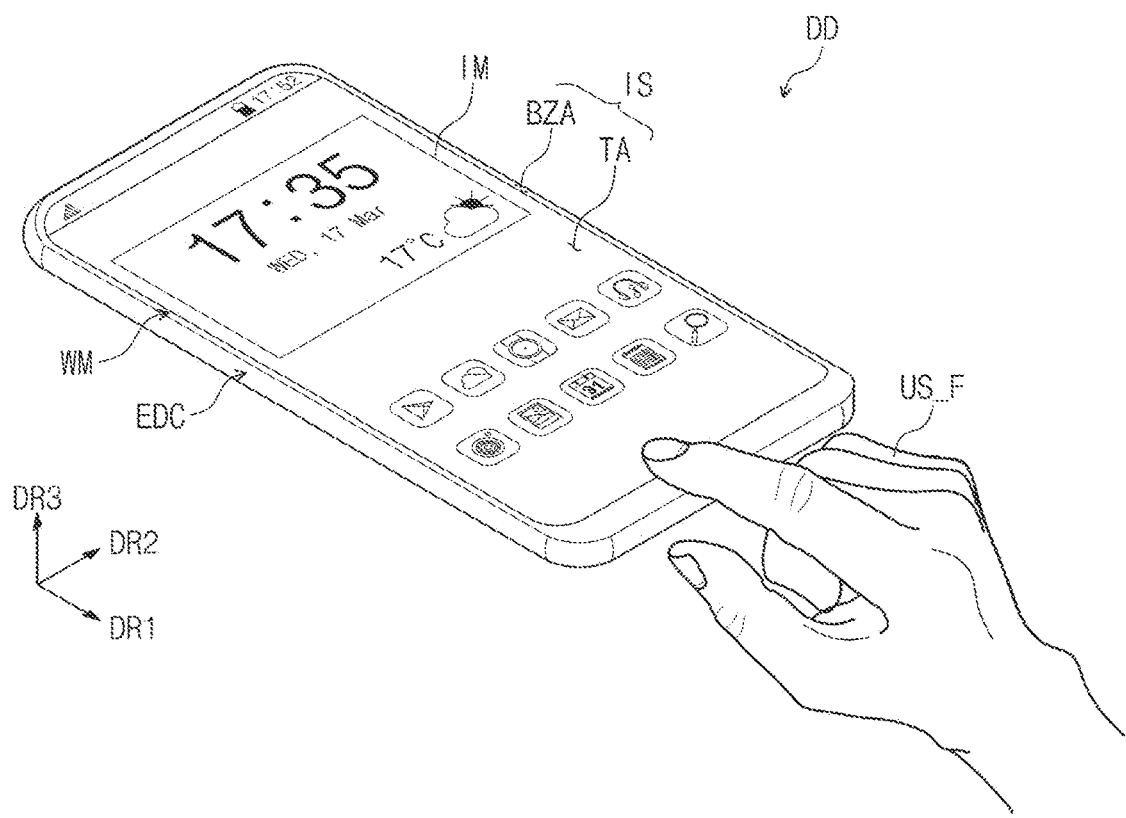
FIG. 1 is a perspective view of a display device, according to an embodiment of the present disclosure.

Hereinafter, embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, redundant description thereof may not be repeated.

When a certain embodiment may be implemented differently, a specific process order may be different from the described order. For example, two consecutively described processes may be performed at the same or substantially at the same time, or may be performed in an order opposite to the described order.

In the drawings, the relative sizes, thicknesses, and ratios of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

In the figures, the x-axis, the y-axis, and the z-axis are not limited to three axes of the rectangular coordinate system, and may be interpreted in a broader sense. For example, the x-axis, the y-axis, and the z-axis may be perpendicular to or substantially perpendicular to one another, or may represent different directions from each other that are not perpendicular to one another.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. Similarly, when a layer, an area, or an element is referred to as being "electrically connected" to another layer, area, or element, it may be directly electrically connected to the other layer, area, or element, and/or may be indirectly electrically connected with one or more intervening layers, areas, or elements therebetween. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. For example, the expression "A and/or B" denotes A, B, or A and B. Expressions such as "at least one of," when preceding a list of elements, modify the entire list of elements and do not modify the individual elements of the list. For example, the expression "at least one of a, b, or c," "at least one of a, b, and c," and "at least one selected from the group consisting of a, b, and c" indicates only a, only b, only c, both a and b, both a and c, both b and c, all of a, b, and c, or variations thereof.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use,"

"using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2:
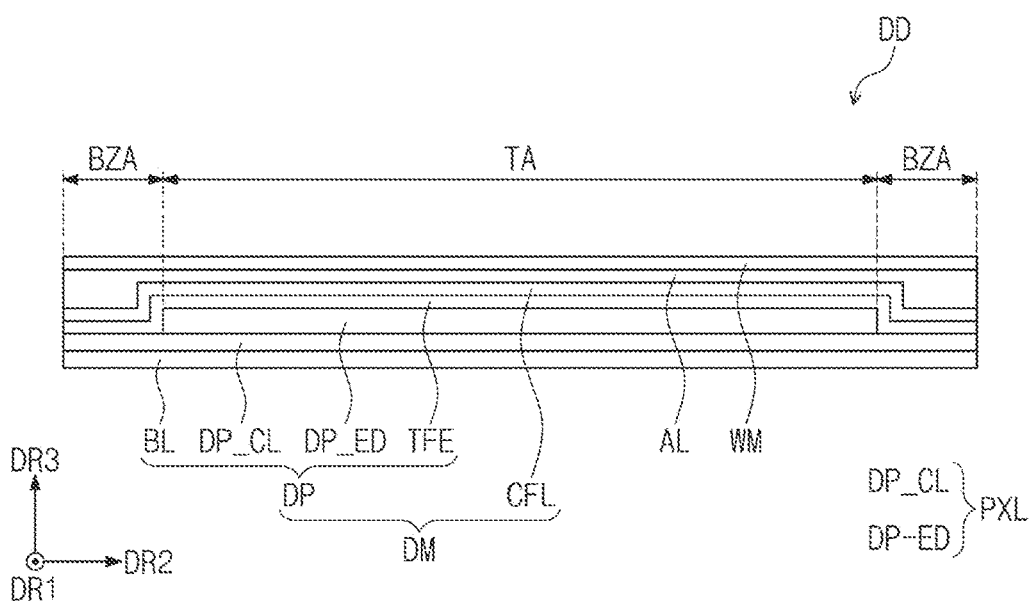
FIG. 2 is a cross-sectional view of a display device, according to an embodiment of the present disclosure.

FIG. 1 is a perspective view of a display device DD, according to an embodiment of the present disclosure. FIG. 2 is a cross-sectional view of the display device DD, according to an embodiment of the present disclosure.

Referring to FIGS. 1 and 2, a display device DD may be a device that is activated depending on an electrical signal. For example, the display device DD may be a mobile phone, a tablet PC, a car navigation system, a game console, or a wearable device, but is not limited thereto. FIG. 1 illustrates, for convenience, that the display device DD is a mobile phone.

In addition, although a rigid-type display device DD in a form of a bar is illustrated in FIG. 1, the present disclosure is limited thereto. For example, the display device DD may be a foldable, rollable, or slidable display device DD.

A top surface of the display device DD may be defined as a display surface IS, and may have a plane defined by a first direction DR1 and a second direction DR2. Images IM generated by the display device DD may be provided to a user through the display surface IS. Hereinafter, a normal direction that is perpendicular to or substantially perpendicular to a plane defined by the first direction DR1 and the second direction DR2 is defined as a third direction DR3. In the specification, the phrases "when viewed from above a plane" and "in a plan view" may mean when an object is viewed in/from the third direction DR3. In other words, the plane may be parallel to or substantially parallel to a plane defined by the first and second directions DR1 and DR2.

The display surface IS may be divided into a transmission area TA and a bezel area BZA. The transmission area TA may be an area in which the images IM are displayed. The user visually perceives the images IM through the transmission area TA. In an embodiment, the transmission area TA is illustrated in the shape of a quadrangle having rounded corners. However, the present disclosure is not limited thereto. The transmission area TA may have various suitable shapes, and is not limited to any particular embodiment.

The bezel area BZA is adjacent to the transmission area TA. The bezel area BZA may have a suitable color (e.g., a predetermined color). The bezel area BZA may surround (e.g., around a periphery of) the transmission area TA. Accordingly, the shape of the transmission area TA may be defined or substantially defined by the bezel area BZA. However, the present disclosure is not limited thereto. For example, the bezel area BZA may be disposed to be adjacent to only one side of the transmission area TA, or may be omitted as needed or desired.

The display device DD may sense an external input applied from the outside. The external input may include various suitable kinds of inputs that are provided from the outside of the display device DD. For example, the external input may include a contact by a part of a body, such as the user's hand US_F, as well as an external input (e.g., hovering) applied when the user's hand US_F approaches the display device DD or is adjacent (e.g., proximal) to the display device DD within a suitable distance (e.g., a predetermined distance). In addition, the external input may have various suitable kinds of inputs, such as force, pressure, temperature, light, and/or the like. The external input may be provided by a separate device, for example, such as an active pen or a digitizer pen. Further, the display device DD may detect the user's biometric information applied from the outside.

The appearance of the display device DD may be composed of a window WM and housing EDC. For example, the window WM and the housing EDC may be coupled to (e.g., connected to or attached to) each other, and other components of the display device DD, for example, such as a display module (e.g., a display or a touch-display) DM may be accommodated therein.

A front surface of the window WM defines the display surface IS of the display device DD. The window WM may include an optically transparent insulating material. For example, the window WM may include glass or plastic. The window WM may include a multi-layered structure or a single layer structure. For example, the window WM may include a plurality of plastic films that are bonded to each other by an adhesive, or may have a glass substrate and a plastic film that are bonded to each other by an adhesive.

The housing EDC may include a suitable material having a relatively high rigidity. For example, the housing EDC may include glass, plastic, or a metal, or may include a plurality of frames and/or plates that are composed of a combination thereof. The housing EDC may stably protect the members and configurations of the display device DD accommodated in the inner space from external impacts. A battery module (e.g., a battery) for supplying power used for the overall operations of the display device DD may be interposed between the display module DM and the housing EDC.

The display module DM may include a display panel DP and an anti-reflection layer CFL.

The display panel DP may be a configuration that generates or substantially generates an image. The display panel DP may be a light emitting display panel. For example, the display panel DP may be an organic light emitting display panel, an inorganic light emitting display panel, an organic-inorganic light emitting display panel, a quantum dot display panel, a micro-LED display panel, or a nano-LED display panel. Hereinafter, for convenience, the display panel DP may be described in more detail in the context of an organic light emitting display panel.

The display panel DP includes a base layer BL, a pixel layer PXL, and an encapsulation layer TFE. The display panel DP according to an embodiment of the present disclosure may be a flexible display panel. However, the present disclosure is not limited thereto. For example, the display panel DP may be a foldable display panel, which is foldable with respect to a folding axis, or a rigid display panel.

The base layer BL may include a synthetic resin layer. The synthetic resin layer may be a polyimide-based resin layer, but the material thereof is not particularly limited thereto. For example, the base layer BL may include a glass substrate, a metal substrate, an organic/inorganic composite substrate, or the like.

The pixel layer PXL is disposed on the base layer BL. The pixel layer PXL may include a circuit layer DP_CL and an element layer DP_ED. The circuit layer DP_CL is interposed between the base layer BL and the element layer DP_ED.

The circuit layer DP_CL includes at least one insulating layer, and a circuit element. Hereinafter, the insulating layer included in the circuit layer DP_CL is referred to as an "intermediate insulating layer". The intermediate insulating layer includes at least one intermediate inorganic film and at least one intermediate organic film. The circuit element may include a pixel driving circuit, which is included in each of a plurality of pixels for displaying an image, and a sensor driving circuit, which is included in each of a plurality of sensors for recognizing external information. The circuit layer DP_CL may further include signal lines connected to the pixel driving circuit and/or the sensor driving circuit.

As an example, each of the plurality of sensors may be a fingerprint recognition sensor, a proximity sensor, an iris recognition sensor, or the like. Furthermore, each of the plurality of sensors may be an optical sensor that recognizes the biometric information in an optical scheme. According to an embodiment of the present disclosure, each of the plurality of sensors may include a plurality of sensors, and may sense an external input (e.g., a user's touch), as well as biometric information (e.g., a fingerprint), by using the plurality of sensors. Accordingly, the display device DD may not include a separate input sensing layer for sensing an external input. In this case, the thickness of the display device DD may be further reduced. As a result, flexibility may be improved, and thus, the display device DD may be implemented in various suitable kinds. For example, the display device DD may be implemented as a foldable, rollable, or slidable display device as described above.

The element layer DP_ED may include a light emitting element included in each of the pixels, and a light sensing element included in each of the sensors. As an example, the light sensing element may be a photodiode. The light sensing element may be a sensor that detects or responds to light reflected by a user's fingerprint. The circuit layer DP_CL and the element layer DP_ED will be described in more detail below with reference to FIG. 6.

The encapsulation layer TFE encapsulates the element layer DP_ED. The encapsulation layer TFE may include at least one organic film and at least one inorganic film. The inorganic film may include one or more inorganic materials, and may protect the element layer DP_ED from moisture/oxygen. The inorganic film may include a silicon nitride layer, a silicon oxynitride layer, a silicon oxide layer, a titanium oxide layer, an aluminum oxide layer, or the like, but is not particularly limited thereto. The organic film may include one or more organic materials, and may protect the element layer DP_ED from foreign objects, such as dust particles.

The anti-reflection layer CFL may be disposed on the display panel DP. The anti-reflection layer CFL may reduce a reflectance of external light incident from the outside of the display device DD. The anti-reflection layer CFL may be formed on the display panel DP through sequential processes, but the present disclosure is not limited thereto. For example, the anti-reflection layer CFL may include color filters, a black matrix, and a planarization layer. The color filters may have a suitable arrangement (e.g., a given or predetermined arrangement). For example, the color filters may be arranged in consideration of the emission colors of the pixels included in the display panel DP. In an embodiment, the anti-reflection layer CFL may include a black matrix and a reflection adjustment layer. The reflection adjustment layer may selectively absorb light in a partial band from among the light reflected from inside the display panel DP and/or an electronic device or incident light from the outside of the display panel DP and/or the electronic device. In an embodiment, the anti-reflection layer CFL may be a polarizing film.

The display device DD according to an embodiment of the present disclosure may further include an adhesive layer AL. The window WM may be attached to the anti-reflection layer CFL by the adhesive layer AL. The adhesive layer AL may include an optical clear adhesive, an optically clear adhesive resin, or a pressure sensitive adhesive (PSA).

Figure 3:
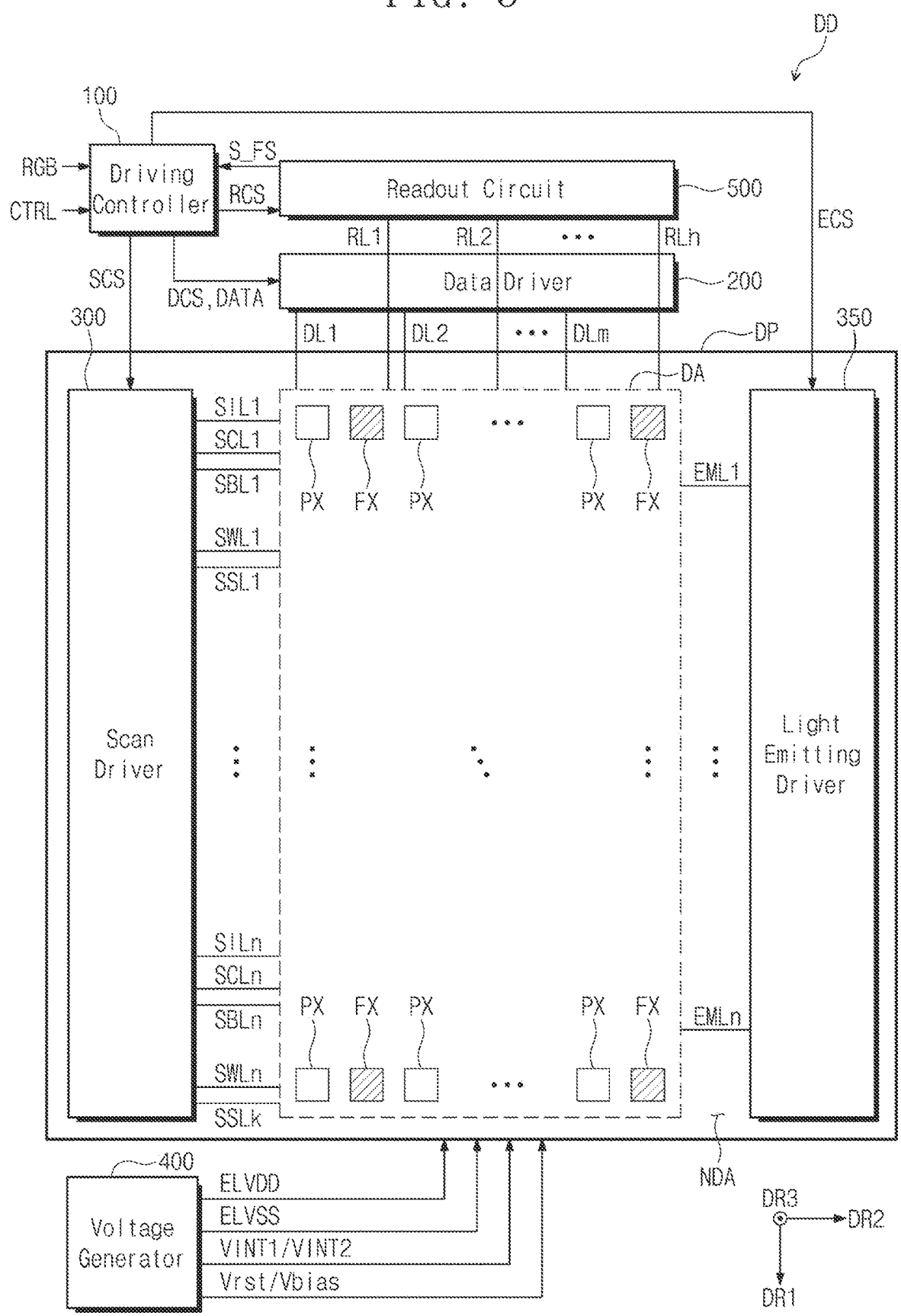
FIG. 3 is a block diagram of a display device, according to an embodiment of the present disclosure.

FIG. 3 is a block diagram of a display device DD, according to an embodiment of the present disclosure.

Referring to FIG. 3, the display device DD includes the display panel DP, a panel driver, and a driving controller 100. As an example, the panel driver includes a data driver 200, a scan driver 300, a light emitting driver 350, a voltage generator 400, and a readout circuit 500.

The driving controller 100 receives an image signal RGB and a control signal CTRL. The driving controller 100 generates an image data signal DATA by converting the data format of the image signal RGB to be suitable for an interface specification of the data driver 200. The driving controller 100 outputs a first control signal SCS, a second control signal ECS, a third control signal DCS, and a fourth control signal RCS.

The data driver 200 receives the third control signal DCS and the image data signal DATA from the driving controller 100. The data driver 200 converts the image data signal DATA into data signals, and outputs the data signals to a plurality of data lines DL1 to DLm to be described in more detail below. The data signals refer to analog voltages corresponding to gray scale values of the image data signal DATA.

The scan driver 300 receives the first control signal SCS from the driving controller 100. The scan driver 300 may output scan signals to scan lines in response to the first control signal SCS.

The voltage generator 400 generates voltages used to operate the display panel DP. In an embodiment, the voltage generator 400 generates a first driving voltage ELVDD, a second driving voltage ELVSS, a first initialization voltage VINT1, a second initialization voltage VINT2, a reset voltage Vrst, and a bias voltage Vbias.

The display panel DP may include a display area DA corresponding to the transmission area TA (e.g., see FIG. 1), and a non-display area NDA corresponding to the bezel area BZA.

The display panel DP may include a plurality of pixels PX disposed in the display area DA, and a plurality of sensors FX disposed in the display area DA. In an embodiment of the present disclosure, each of the plurality of sensors FX may be interposed between two corresponding pixels PX that are adjacent to each other. The plurality of pixels PX and the plurality of sensors FX may be alternately disposed on a plane defined in the first and second directions DR1 and DR2. However, the present disclosure is not limited thereto. In other words, two or more pixels PX may be positioned between two corresponding sensors FX that are adjacent to each other in the first direction DR1 from among the plurality of sensors FX. As another example, two or more pixels PX may be positioned between two corresponding sensors FX that are adjacent to each other in the second direction DR2 from among the plurality of sensors FX.

The display panel DP further includes initialization scan lines SIL1 to SILn, compensation scan lines SCL1 to SCLn, write scan lines SWL1 to SWLn, black scan lines SBL1 to SBLn, emission control lines EML1 to EMLn, the data lines DL1 to DLm, operation scan lines SSL1 to SSLk, and readout lines RL1 to RLh, where n, m, k, and h are natural numbers.

The initialization scan lines SIL1 to SILn, the compensation scan lines SCL1 to SCLn, the write scan lines SWL1 to SWLn, the black scan lines SBL1 to SBLn, the operation scan lines SSL1 to SSLk, and the emission control lines EML1 to EMLn extend in the second direction DR2. The initialization scan lines SIL1 to SILn, the compensation scan lines SCL1 to SCLn, the write scan lines SWL1 to SWLn, the black scan lines SBL1 to SBLn, and the emission control lines EML1 to EMLn are arranged to be spaced from one another along the first direction DR1. The data lines DL1 to DLm and the readout lines RL1 to RLh extend in the first direction DR1, and are arranged to be spaced from one another along the second direction DR2.

The plurality of pixels PX are electrically connected to the initialization scan lines SIL1 to SILn, the compensation scan lines SCL1 to SCLn, the write scan lines SWL1 to SWLn, the black scan lines SBL1 to SBLn, the emission control lines EML1 to EMLn, and the data lines DL1 to DLm. For example, each of the plurality of pixels PX may be electrically connected with four scan lines. However, the number of scan lines connected to each pixel PX is not limited thereto, and may be variously modified as needed or desired.

The plurality of sensors FX are electrically connected to the operation scan lines SSL1 to SSLk and the readout lines RL1 to RLh. One sensor FX may be electrically connected to one scan line. However, the present disclosure is not limited thereto. The number of scan lines connected to each of the sensors FX may be variously modified as needed or desired. In an embodiment of the present disclosure, the number of the readout lines RL1 to RLh may correspond to ½ of the number of data lines DL1 to DLm. However, the present disclosure is not limited thereto. As another example, the number of the readout lines RL1 to RLh may correspond to ¼ or ⅛ of the number of the data lines DL1 to DLm.

The scan driver 300 may be disposed in the non-display area NDA of the display panel DP. However, the present disclosure is not particularly limited thereto. For example, at least part of the scan driver 300 may be disposed in the display area DA.

The scan driver 300 receives the first control signal SCS from the driving controller 100. In response to the first control signal SCS, the scan driver 300 outputs initialization scan signals to the initialization scan lines SIL1 to SILn, and outputs compensation scan signals to the compensation scan lines SCL1 to SCLn. Furthermore, in response to the first control signal SCS, the scan driver 300 may output write scan signals to the write scan lines SWL1 to SWLn, may output black scan signals to the black scan lines SBL1 to SBLn, and may output operation scan signals as the operation scan lines SSL1 to SSLk.

The scan driver 300 may include a first driver and a second driver. The first driver may include first and second scan stages. The first scan stage may output an initialization scan signal and a compensation scan signal.

In an embodiment of the present disclosure, the second scan stage may output a write scan signal and a black scan signal, and the second driver may output operation scan signals to the operation scan lines SSL1 to SSLk. The write scan signal may be referred to as a "first scan signal", and the operation scan signal may be referred to as a "second scan signal". In an embodiment of the present disclosure, the second scan driver may output the write scan signal, the black scan signal, and the first operation scan signal, and the second driver may output the second operation scan signal. The write scan signal and the first operation scan signal may be the same signal as each other. In an embodiment, the operation scan lines SSL1 to SSLk may receive the first operation scan signal or the second operation scan signal.

The light emitting driver 350 may be disposed in the non-display area NDA of the display panel DP. The light emitting driver 350 receives the second control signal ECS from the driver controller 100. The light emitting driver 350 may output emission control signals to the emission control lines EML1 to EMLn in response to the second control signal ECS. As another example, the scan driver 300 may be connected to the emission control lines EML1 to EMLn. In this case, the light emitting driver 350 may be omitted, and the scan driver 300 may output the emission control signals to the emission control lines EML1 to EMLn.

The readout circuit 500 receives the fourth control signal RCS from the driving controller 100. The readout circuit 500 may receive detection signals from the readout lines RL1 to RLh in response to the fourth control signal RCS. The readout circuit 500 may process the detection signals received from the readout lines RL1 to RLh, and may provide processed detection signals S_FS to the driving controller 100. The driving controller 100 may recognize biometric information or coordinate information about an external input based on the detection signals S_FS.

Figure 4A:
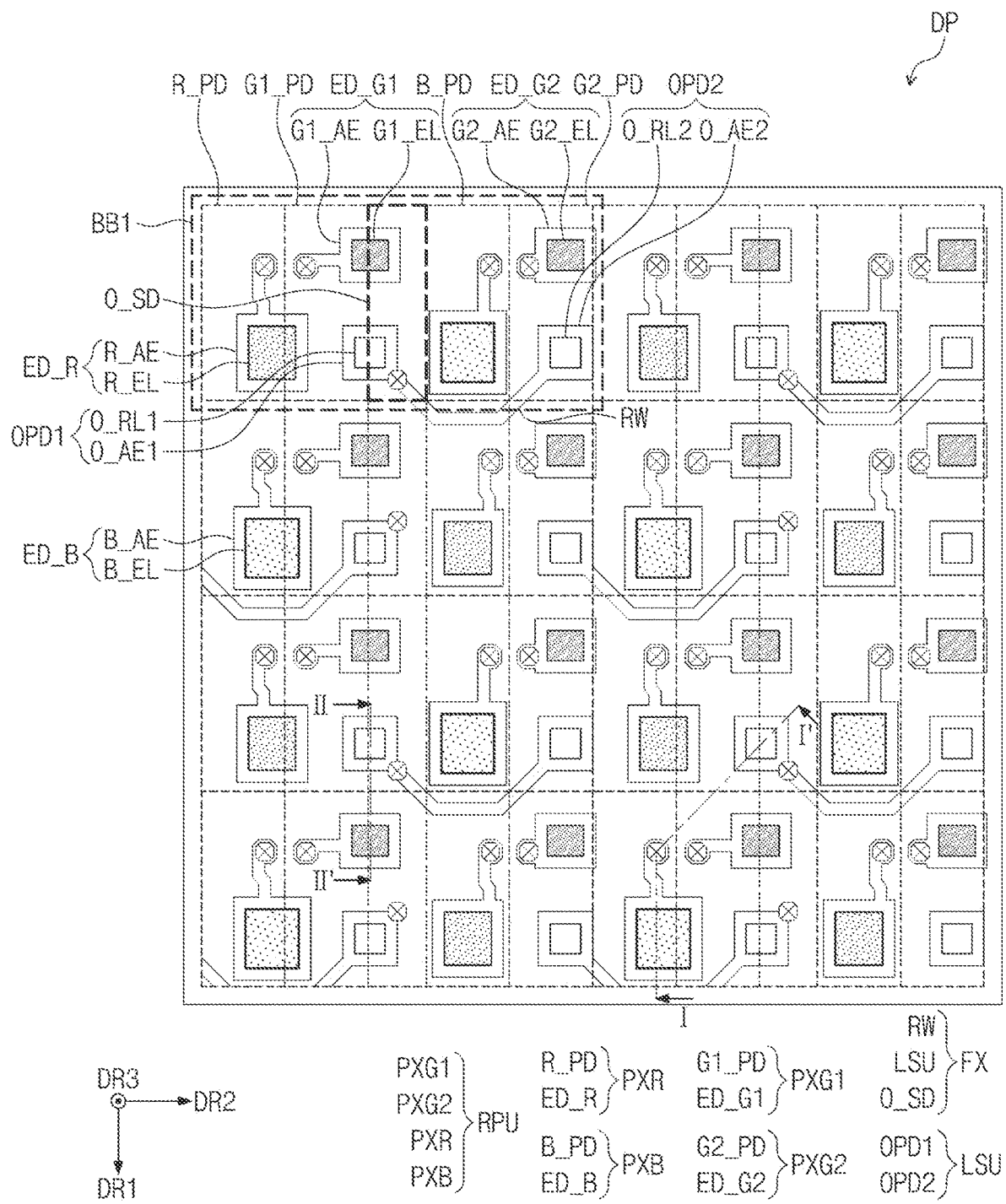
FIG. 4A is an enlarged plan view of a partial area of a display panel, according to embodiments of the present disclosure.

FIG. 4A is an enlarged plan view of a partial area of the display panel DP, according to embodiments of the present disclosure.

Referring to FIG. 4A, the display panel DP includes a plurality of pixels PXR, PXG1, PXG2, and PXB, and the plurality of sensors FX.

The plurality of pixels PXR, PXG1, PXG2, and PXB may be grouped into a plurality of reference pixel units RPU. As an example, each of the reference pixel units RPU may include two first pixels PXG1 and PXG2 (hereinafter referred to as "first and second green pixels"), one second pixel PXR (hereinafter referred to as a "red pixel"), and one third pixel PXB (hereinafter referred to as a "blue pixel"). However, the number of pixels included in each of the reference pixel units RPU is not limited thereto. As another example, each of the reference pixel units RPU may include three pixels, for example, such as one green pixel PXG (e.g., one of the first green pixel PXG1 or the second green pixel PXG2), one red pixel PXR, and one blue pixel PXB.

The first and second green pixels PXG1 and PXG2 include first light emitting elements ED_G1 and ED_G2 (hereinafter, referred to as "first and second green light emitting elements"), respectively. The red pixel PXR includes a second light emitting element ED_R (hereinafter, referred to as a "red light emitting element"). The blue pixel PXB includes a third light emitting element ED_B (hereinafter, referred to as a "blue light emitting element"). As an example, each of the first and second green light emitting elements ED_G1 and ED_G2 outputs a first color light (e.g., green light), the red light emitting element ED_R outputs a second color light (e.g., red light) different from the first color light, and the blue light emitting element ED_B outputs a third color light (e.g., blue light) different from the first and second color lights. The green light output from the first green light emitting element ED_G1 may have the same or substantially the same wavelength band as that of the green light output from the second green light emitting element ED_G2.

In the first and second directions DR1 and DR2, the red light emitting elements ED_R and the blue light emitting elements ED_B may be arranged alternately and repeatedly. The first and second green light emitting elements ED_G1 and ED_G2 are alternately and repeatedly arranged in the first direction DR1, and alternately and repeatedly arranged in the second direction DR2. The first and second green light emitting elements ED_G1 and ED_G2 may be arranged in different rows and columns from the rows and columns in which the red light emitting elements ED_R and the blue light emitting elements ED_B are arranged, in the first and second directions DR1 and DR2.

As an example, the red light emitting element ED_R may have a larger size than those of the first and second green light emitting elements ED_G1 and ED_G2. In addition, the blue light emitting element ED_B may have a size greater than or equal to that of the red light emitting element ED_R. The size of each of the light emitting elements ED_R, ED_G1, ED_G2, and ED_B is not limited thereto, and may be variously modified and applied as needed or desired. For example, in an embodiment of the present disclosure, the light emitting elements ED_R, ED_G1, ED_G2, and ED_B may have the same or substantially the same size as one another.

The first green light emitting element ED_G1 is electrically connected to a first green pixel driving circuit G1_PD. In more detail, the first green light emitting element ED_G1 includes a first green anode G1_AE and a first green light emitting layer G1_EL. The first green anode G1_AE is connected to the first green pixel driving circuit G1_PD through a contact hole. The second green light emitting element ED_G2 is electrically connected to a second green pixel driving circuit G2_PD. In more detail, the second green light emitting element ED_G2 includes a second green anode G2_AE and a second green light emitting layer G2_EL. The second green anode G2_AE is connected to the second green pixel driving circuit G2_PD through a contact hole.

The red light emitting element ED_R is electrically connected to a red pixel driving circuit R_PD. In more detail, the red light emitting element ED_R includes a red anode R_AE and a red light emitting layer R_EL. The red anode R_AE is connected to the red pixel driving circuit R_PD through a contact hole. The blue light emitting element ED_B is electrically connected to a blue pixel driving circuit B_PD. In more detail, the blue light emitting element ED_B includes a blue anode B_AE and a blue light emitting layer B_EL. The blue anode B_AE is connected to the blue pixel driving circuit B_PD through a contact hole.

Each of the sensors FX includes a light sensing unit (e.g., a light sensor) LSU and a sensor driving circuit O_SD. The light sensing unit LSU may include at least one light sensing element. As an example, the light sensing unit LSU includes 'z' light sensing elements, and one of the 'z' light sensing elements is connected to a sensor driving circuit. Here, 'z' may be a natural number greater than or equal to 1. FIG. 4A shows a case where 'z' is equal to 2. When 'z' equals 2, the light sensing unit LSU includes two light sensing elements (hereinafter referred to as "first and second light sensing elements OPD1 and OPD2"). As an example, two light sensing elements (e.g., the first and second light sensing elements OPD1 and OPD2) may be arranged to correspond to one reference pixel unit RPU. However, the number of light sensing elements arranged to correspond to each reference pixel unit RPU is not limited thereto. For example, one light sensing element may be disposed to correspond to one reference pixel unit RPU.

Each of the first and second light sensing elements OPD1 and OPD2 is disposed between corresponding red and blue light emitting elements ED_R and ED_B in the second direction DR2. Each of the first and second light sensing elements OPD1 and OPD2 may be disposed to be adjacent to the first green light emitting element ED_G1 or the second green light emitting element ED_G2 in the first direction DR1. In a first reference pixel unit line, the first light sensing element OPD1 and the first green light emitting element ED_G1 are adjacent to each other in the first direction DR1, and the second light sensing element OPD2 and the second green light emitting element ED_G2 are adjacent to each other in the first direction DR1. In a second reference pixel unit line, the first light sensing element OPD1 and the second green light emitting element ED_G2 are adjacent to each other in the first direction DR1, and the second light sensing element OPD2 and the first green light emitting element ED_G1 are adjacent to each other in the first direction DR1. As an example, each of the first and second light sensing elements OPD1 and OPD2 is disposed between corresponding first and second green light emitting elements ED_G1 and ED_G2 that are adjacent to each other in the first direction DR1.

The sensor driving circuit O_SD is connected to one of the first and second light sensing elements OPD1 and OPD2 (e.g., the first light sensing element OPD1). The sensor driving circuit O_SD may have the same or substantially the same length as those of the red and blue pixel driving circuits R_PD and B_PD in the first direction DR1. The sensor driving circuit O_SD may overlap with one of the first and second light sensing elements OPD1 and OPD2 (e.g., the first light sensing element OPD1) on a plane (e.g., in a plan view). The sensor driving circuit O_SD may overlap with one of the first and second green light emitting elements ED_G1 and ED_G2 (e.g., the first green light emitting element ED_G1) on a plane (e.g., in a plan view).

The first light sensing element OPD1 includes a first anode O_AE1 and a first photoelectric conversion layer O_RL1. The second light sensing element OPD2 includes a second anode O_AE2 and a second photoelectric conversion layer O_RL2. The first anode O_AE1 is directly connected to the sensor driving circuit O_SD through a contact hole.

Each of the sensors FX may further include a routing wire RW electrically connecting the first and second light sensing elements OPD1 and OPD2 to each other. The routing wire RW is electrically connected to the first anode O_AE1 and the second anode O_AE2. As an example, the routing wire RW may be integrated with (e.g., integrally formed with) the first anode O_AE1 and the second anode O_AE2.

The routing wire RW, the first anode O_AE1, and the second anode O_AE2 may be positioned at (e.g., in or on) the same layer as that of the anodes R_AE, G1_AE, G2_AE, and B_AE. In this case, the routing wire RW, the first anode O_AE1, and the second anode O_AE2 may include the same material as that of the anodes R_AE, G1_AE, G2_AE, and B_AE, and may be provided through the same process.

The first and second light sensing elements OPD1 and OPD2 may be connected in parallel with each other to the sensor driving circuit O_SD through the routing wires RW. Accordingly, the first and second light sensing elements OPD1 and OPD2 may be concurrently (e.g., simultaneously or substantially simultaneously) turned on with each other or concurrently (e.g., simultaneously or substantially simultaneously) turned off with each other by the sensor driving circuit O_SD.

Figure 4B:
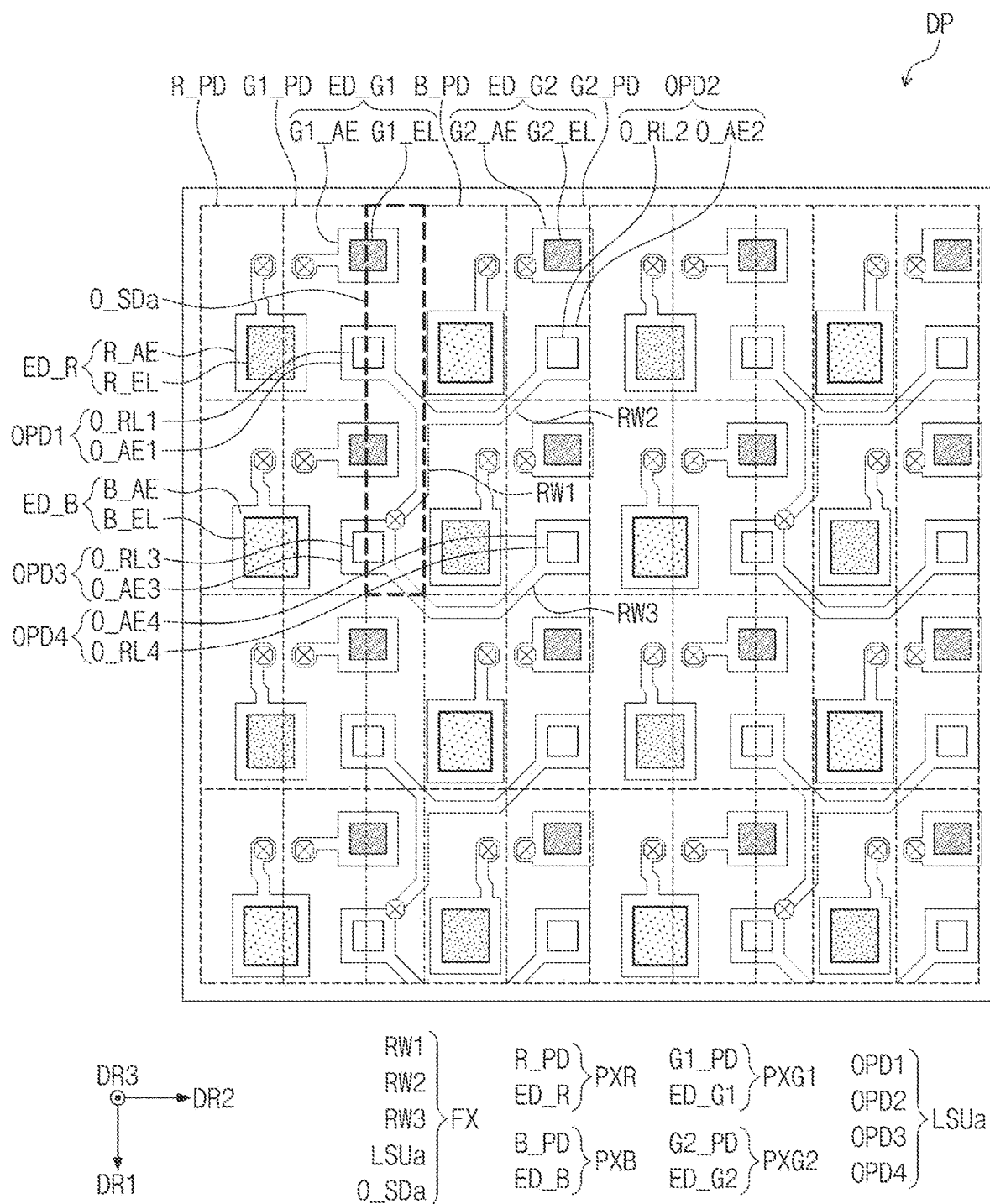
FIG. 4B is an enlarged plan view of a partial area of a display panel, according to embodiments of the present disclosure.

FIG. 4B is an enlarged plan view of a partial area of the display panel DP, according to embodiments of the present disclosure.

FIG. 4B illustrates a case in which 'z' is equal to four, such that a light sensing unit (e.g., a light sensor) LSUa may include four light sensing elements (hereinafter referred to as "first to fourth light sensing elements OPD1, OPD2, OPD3, and OPD4). One of the first to fourth light sensing elements OPD1, OPD2, OPD3, and OPD4 (e.g., the third light sensing element OPD3) is connected to a sensor driving circuit O_SDa.

Each of the sensors FX may further include three routing wires (hereinafter referred to as "first to third routing wires RW1, RW2, and RW3") electrically connecting the first to fourth light sensing elements OPD1, OPD2, OPD3, and OPD4 to one another. The first routing wire RW1 electrically connects two adjacent light sensing elements (e.g., the first and third light sensing elements OPD1 and OPD3) from among the four light sensing elements OPD1, OPD2, OPD3, and OPD4 to each other in the first direction DR1. The second routing wire RW2 electrically connects two adjacent light sensing elements (e.g., the first and second light sensing elements OPD1 and OPD2) from among the four light sensing elements OPD1, OPD2, OPD3, and OPD4 to each other in the second direction DR2. The third routing wire RW3 electrically connects two adjacent light sensing elements (e.g., the third and fourth light sensing elements OPD3 and OPD4) from among the four light sensing elements OPD1, OPD2, OPD3, and OPD4 to each other in the second direction DR2.

The first light sensing element OPD1 includes a first anode O_AE1 and a first photoelectric conversion layer O_RL1. The second light sensing element OPD2 includes a second anode O_AE2 and a second photoelectric conversion layer O_RL2. The third light sensing element OPD3 includes a third anode O_AE3 and a third photoelectric conversion layer O_RL3. The fourth light sensing element OPD4 includes a fourth anode O_AE4 and a fourth photoelectric conversion layer O_RL4. The third anode O_AE3 is directly connected to the sensor driving circuit O_SDa through a contact hole. The sensor driving circuit O_SDa may have a length greater than that of the red and blue pixel driving circuits R_PD and B_PD in the first direction DR1. Accordingly, the sensor driving circuit O_SDa may be disposed to overlap with two of the first to fourth light sensing elements OPD1 to OPD4 (e.g., the first and third light sensing elements OPD1 and OPD3) on a plane (e.g., in a plan view). The sensor driving circuit O_SDa may overlap with two green light emitting elements (e.g., the first and second green light emitting elements ED_G1 and ED_G2) on a plane (e.g., in a plan view).

The first routing wire RW1 is electrically connected to the first anode O_AE1 and the third anode O_AE3, and the second routing wire RW2 is electrically connected to the first anode O_AE1 and the second anode O_AE2. The third routing wire RW3 is electrically connected to the third anode O_AE3 and the fourth anode O_AE4. As an example, the first to third routing wires RW1 to RW3 may be integrated with (e.g., integrally formed with) the first to fourth anodes O_AE1 to O_AE4.

The first to third routing wires RW1 to RW3 and the first to fourth anodes O_AE1 to O_AE4 may be disposed at (e.g., in or on) the same layer as that of the anodes R_AE, G1_AE, G2_AE, and B_AE. In this case, the first to third routing wires RW1 to RW3 and the first to fourth anodes O_AE1 to O_AE4 may include the same material as that of the anodes R_AE, G1_AE, G2_AE, and B_AE, and may be provided through the same process.

The first to fourth light sensing elements OPD1, OPD2, OPD3, and OPD4 may be connected in parallel with each other to the sensor driving circuit O_SDa through the first to third routing wires RW1 to RW3. Accordingly, the first to fourth light sensing elements OPD1, OPD2, OPD3, and OPD4 may be concurrently (e.g., simultaneously or substantially simultaneously) turned on or concurrently (e.g., simultaneously or substantially simultaneously) turned off by the sensor driving circuit o_SDa.

Referring to FIGS. 4A and 4B, each of the sensor driving circuits O_SD and O_SDa may include a plurality of transistors. As an example, the sensor driving circuits O_SD and O_SDa and the pixel driving circuits R_PD, G1_PD, G2_PD, and B_PD may be concurrently (e.g., simultaneously or substantially simultaneously) formed with one another through the same process. In addition, the scan driver 300 (e.g., see FIG. 3) may include transistors formed through the same process as those of the sensor driving circuits O_SD and O_SDa and the pixel driving circuits R_PD, G1_PD, G2_PD, and B_PD.

Figure 4C:
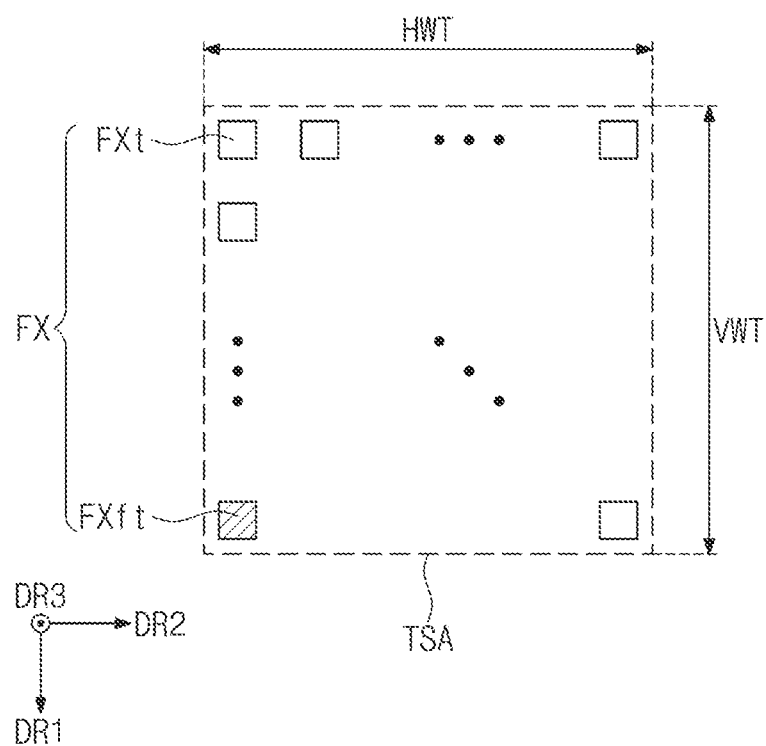
FIG. 4C is a diagram illustrating a plurality of sensors disposed in a reference area, according to an embodiment of the present disclosure.

FIG. 4C is a diagram illustrating a plurality of sensors disposed in a reference area, according to an embodiment of the present disclosure.

Referring to FIGS. 3 and 4C, a plurality of reference areas TSA may be defined in the display panel DP. FIG. 4C shows one reference area TSA and the plurality of sensors FX disposed in the one reference area TSA.

For example, a pitch between the pixels PX of the display panel DP of 420 ppi may be 60 micrometers or less, and a pitch between the pixels PX of the display panel DP of 508 ppi may be less than 50 micrometers. In this case, an area where 20 pixels PX are arranged in each of the first direction DR1 and the second direction DR2 may be defined as (e.g., set as) a reference area. The reference area may have a horizontal width HWT of 1 mm to 1.2 mm, and a vertical width VWT of 1 mm to 1.2 mm. The "ppi" of the display panel DP, the horizontal width HWT, and the vertical width VWT of the reference area are provided as examples, but the present disclosure is not particularly limited thereto. In an embodiment, the horizontal width HWT of the reference area may be equal to or substantially equal to (e.g., set to) 4 mm, and the vertical width VWT may be equal to or substantially equal to 4 mm.

In a case of fingerprint sensing, information based on a difference between a ridge and a valley of a fingerprint may be obtained. On the other hand, in a case of sensing input coordinates, information about a touch location may be desired, regardless of the information based on a difference between a ridge and a valley. In other words, the resolution of the sensors FX used during fingerprint sensing may be higher than the resolution of the sensors FX used during touch sensing. Accordingly, unlike the fingerprint sensing, to detect input coordinates corresponding to a touch, all the sensors FX included in the display panel DP (e.g., see FIG. 4A) may not need to operate. For example, the plurality of reference areas TSA may be defined on the display panel DP (e.g., see FIG. 4A), and input coordinates may be detected by using at least one sensor FXft from among the plurality of sensors FX disposed in each of the plurality of reference areas TSA.

Also, operating frequencies of the sensors FX during fingerprint sensing may be lower than operating frequencies of the sensors FX during touch sensing. For example, when a fingerprint is sensed, light may need to be sufficiently received during a time (e.g., a predetermined time) or more to sufficiently obtain the information based on a difference between a ridge and a valley of a fingerprint. When input coordinates by a touch are sensed, touch sensitivity may be improved as the operating frequency increases. For example, during fingerprint sensing, the sensors FX may operate at 120 Hz. During touch sensing, the sensors FX may operate at 240 Hz. However, the present disclosure is not limited thereto, and the frequency during fingerprint sensing and the frequency during touch sensing may be variously modified as needed or desired.

Figure 5:
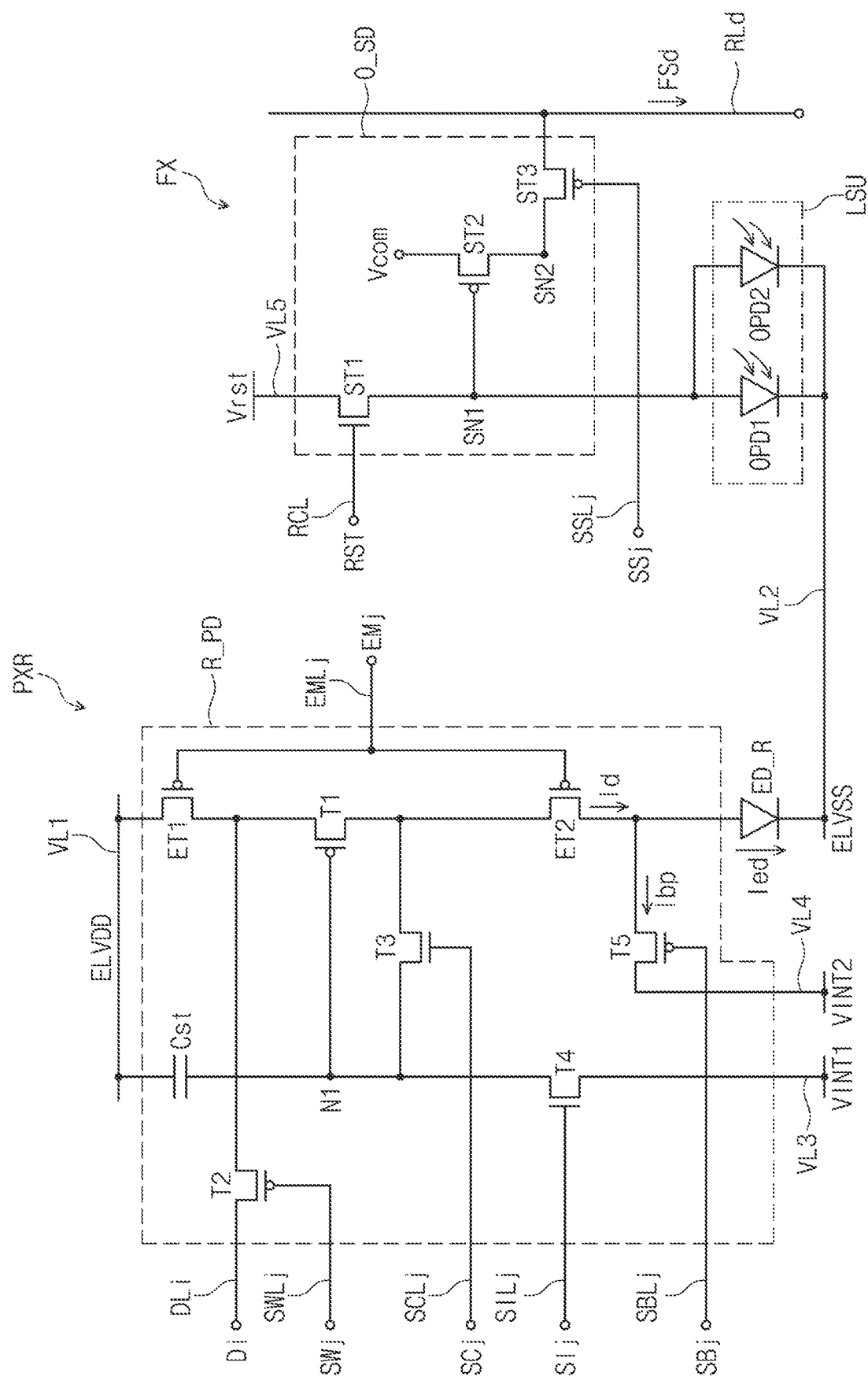
FIG. 5 is an equivalent circuit diagram of a pixel and a sensor, according to an embodiment of the present disclosure.

FIG. 5 is an equivalent circuit diagram of a pixel PXR and the sensor FX, according to an embodiment of the present disclosure.

FIG. 5 shows an equivalent circuit diagram of one pixel (e.g., the red pixel PXR) from among the plurality of pixels PX (e.g., see FIG. 3). Because the plurality of pixels PX have the same or substantially the same circuit structure as each other, the circuit structure of the red pixel PXR will be described in more detail hereinafter, and redundant description of the other remaining pixels PX may not be repeated. Further, FIG. 5 shows an equivalent circuit diagram of one sensor FX from among the plurality of sensors FX shown in FIG. 3. Because the plurality of sensors FX have the same or substantially the same circuit structure as each other, the circuit structure for the sensor FX will be described in more detail hereinafter, and redundant description of the other remaining sensors FX may not be repeated.

Referring to FIGS. 3 and 5, the red pixel PXR is connected to an i-th data line DLi from among the data lines DL1 to DLm, a j-th initialization scan line SILj from among the initialization scan lines SIL1 to SILn, a j-th compensation scan line SCLj from among the compensation scan lines SCL1 to SCLn, a j-th write scan line SWLj from among the write scan lines SWL1 to SWLn, a j-th black scan line SBLj from among the black scan lines SBL1 to SBLn, and a j-th emission control line EMLj from among the emission control lines EML1 to EMLn.

The red pixel PXR includes the red light emitting element ED_R and the red pixel driving circuit R_PD. The red light emitting element ED_R may be a light emitting diode. As an example, the red light emitting element ED_R may be an organic light emitting diode including an organic light emitting layer.

The red pixel driving circuit R_PD includes first to fifth transistors T1, T2, T3, T4, and T5, first and second emission control transistors ET1 and ET2, and a capacitor Cst.

At least one transistor from among the first to fifth transistors T1, T2, T3, T4, and T5 and the first and second emission control transistors ET1 and ET2 may include a low-temperature polycrystalline silicon (LTPS) semiconductor layer. At least one transistor from among the first to fifth transistors T1, T2, T3, T4, and T5 and the first and second emission control transistors ET1 and ET2 may include an oxide semiconductor layer. For example, the third and fourth transistors T3 and T4 may be oxide semiconductor transistors, and the first, second, and fifth transistors T1, T2, and T5, and the first and second emission control transistors T1 and T2 may be LTPS transistors.

In more detail, the transistor T1 directly exerting an influence on the brightness of the display device DD (e.g., see FIG. 1) may be configured to include a semiconductor layer including polycrystalline silicon having high reliability, and thus, a higher-resolution display device may be implemented. However, because the oxide semiconductor has high carrier mobility and low leakage current, a voltage drop may not be significant even though a driving time is long. In other words, even when the display device operates at a low frequency, the color of an image may not be significantly changed due to the voltage drop, and thus, the display device may operate at the low frequency. As such, the oxide semiconductor has a weak leakage current.

Accordingly, the leakage current is prevented or substantially prevented from flowing into a driving gate electrode, while reducing power consumption by employing at least one of the third transistor T3 or the fourth transistor T4, which are connected to the driving gate electrode of the first transistor T1, as an oxide semiconductor.

Some of the first to fifth transistors T1, T2, T3, T4, and T5, and the first and second emission control transistors ET1 and ET2 may be P-type transistors, and the others thereof may be N-type transistors. For example, the first, second, and fifth transistors T1, T2, and T5, and the first and second emission control transistors ET1 and ET2 may be P-type transistors, and the third and fourth transistors T3 and T4 may be N-type transistors.

However, a configuration of the red pixel driving circuit R_PD is not limited to the embodiment illustrated in FIG. 5. The red pixel driving circuit R_PD illustrated in FIG. 5 is provided as an example. Thus, the configuration of the red pixel driving circuit R_PD may be variously modified and implemented as needed or desired. For example, each of the first to fifth transistors T1, T2, T3, T4, and T5, and the first and second emission control transistors ET1 and ET2 may be a P-type transistor or an N-type transistor.

The j-th initialization scan line SILj, the j-th compensation scan line SCLj, the j-th write scan line SWLj, the j-th black scan line SBLj, and the j-th emission control line EMLj may transfer a j-th initialization scan signal Slj, a j-th compensation scan signal SCj, a j-th write scan signal SWj, a j-th black scan signal SBj, and a j-th emission control signal EMj, respectively, to the red pixel PXR. The i-th data line DLi transfers an i-th data signal Di to the red pixel PXR. The i-th data signal Di may have a voltage level corresponding to the image signal RGB input to the display device DD (e.g., see FIG. 3).

First and second driving voltage lines VL1 and VL2 may deliver the first and second driving voltages ELVDD and ELVSS, respectively, to the red pixel PXR. First and second initialization voltage lines VL3 and VL4 may deliver the first and second initialization voltages VINT1 and VINT2, respectively to the red pixel PXR.

The first transistor T1 is connected between the first driving voltage line VL1 for receiving the first driving voltage ELVDD and the red light emitting element ED_R. The first transistor T1 includes a first electrode connected to the first driving voltage line VL1 via the first emission control transistor ET1, a second electrode connected to the red anode R_AE (e.g., see FIG. 4A) of the red light emitting element ED_R via the second emission control transistor ET2, and a third electrode (e.g., a gate electrode) connected to one end (e.g., a first node N1) of the capacitor Cst. The first transistor T1 may receive the data signal Di transferred through the i-th data line DLi depending on a switching operation of the second transistor T2, and may supply a driving current Id to the red light emitting element ED_R.

The second transistor T2 is connected between the i-th data line DLi and the first electrode of the first transistor T1. The second transistor T2 includes a first electrode connected with the i-th data line DLi, a second electrode connected with the first electrode of the first transistor T1, and a third electrode (e.g., a gate electrode) connected with the j-th write scan line SWLj. The second transistor T2 may be turned on in response to the write scan signal SWj transferred through the j-th write scan line SWLj, and may transfer the i-th data signal Di transferred from the i-th data line DLi to the first electrode of the first transistor T1.

The third transistor T3 is connected between the second electrode of the first transistor T1 and the first node N1. The third transistor T3 includes a first electrode connected with the third electrode of the first transistor T1, a second electrode connected with the second electrode of the first transistor T1, and a third electrode (e.g., a gate electrode) connected with the j-th compensation scan line SCLj. The third transistor T3 may be turned on in response to the j-th compensation scan signal SCj transferred through the j-th compensation scan line SCLj, and may connect the third electrode and the second electrode of the first transistor T1 to each other. In this case, the first transistor T1 may be diode-connected.

The fourth transistor T4 is connected between the first node N1 and the first initialization voltage line VL3 through which the first initialization voltage VINT1 is applied. The fourth transistor T4 includes a first electrode connected to the first initialization voltage line VL3 through which the first initialization voltage VINT1 is supplied, a second electrode connected to the first node N1, and a third electrode (e.g., a gate electrode) connected to the j-th initialization scan line SILj. The fourth transistor T4 is turned on in response to the j-th initialization scan signal SIj transferred through the j-th initialization scan line SILj. The fourth transistor T4 that is turned on may transfer the first initialization voltage VINT1 to the first node N1, such that a potential of the third electrode of the first transistor T1 (e.g., a potential of the first node N1) is initialized.

The first emission control transistor ET1 includes a first electrode connected with the first driving voltage line VL1, a second electrode connected with the first electrode of the first transistor T1, and a third electrode (e.g., a gate electrode) connected with the j-th emission control line EMLj.

The second emission control transistor ET2 includes a first electrode connected to the second electrode of the first transistor T1, a second electrode connected to the red anode R_AE (e.g., see FIG. 4A) of the red light emitting element ED_R, and a third electrode (e.g., a gate electrode) connected to j-th emission control line EMLj.

The first and second emission control transistors ET1 and ET2 are concurrently (e.g., simultaneously or substantially simultaneously) turned on with each other in response to the j-th emission control signal EMj transferred through the j-th emission control line EMLj. The first driving voltage ELVDD applied through the first emission control transistor ET1 that is turned on may be compensated through the diode-connected transistor T1, and may be transferred to the red light emitting element ED_R.

The fifth transistor T5 includes a first electrode connected to the second initialization voltage line VL4 through which the second initialization voltage VINT2 is supplied, a second electrode connected to the second electrode of the second emission control transistor ET2, and a third electrode (e.g., a gate electrode) connected to the j-th black scan line SBLj. A voltage level of the second initialization voltage VINT2 may lower than or equal to that of the first initialization voltage VINT1. As an example, each of the first and second initialization voltages VINT1 and VINT2 may have a voltage of −3.5 V.

As described above, one end of the capacitor Cst is connected with the third electrode of the first transistor T1, and the other end of the capacitor Cst is connected with the first driving voltage line VL1. A cathode of the red light emitting element ED_R may be connected with the second driving voltage line VL2 that transfers the second driving voltage ELVSS. A voltage level of the second driving voltage ELVSS may be lower than a voltage level of the first driving voltage ELVDD. According to an embodiment of the present disclosure, the first driving voltage ELVDD may be 4.6 V, and the second driving voltage ELVSS may be −2.5 V.

The sensor FX is connected to a d-th readout line RLd from among the readout lines RL1 to RLh, a j-th operation scan line SSLj, and a reset control line RCL.

The sensor FX includes the light sensing unit LSU and the sensor driving circuit O_SD. The light sensing unit LSU may include 'z' light sensing elements that are connected to each other in parallel. When 'z' is equal to 2, the first and second light sensing elements OPD1 and OPD2 may be connected in parallel to each other. Each of the first and second light sensing elements OPD1 and OPD2 may be a photodiode. As an example, each of the first and second light sensing elements OPD1 and OPD2 may be an organic photodiode including an organic material as a photoelectric conversion layer. The first and second anodes O_AE1 and O_AE2 (e.g., see FIG. 4A) of the first and second light sensing elements OPD1 and OPD2 may be connected to a first sensing node SN1. First and second cathodes may be connected to the second driving voltage line VL2 for delivering the second driving voltage ELVSS. When 'k' is equal to 4, the first to fourth light sensing elements OPD1 to OPD4 (e.g., see FIG. 4B) may be connected in parallel to each other.

The sensor driving circuit O_SD includes three transistors ST1, ST2, and ST3. The three transistors ST1, ST2, and ST3 may include the reset transistor ST1, the amplification transistor ST2, and the output transistor ST3. At least one of the reset transistor ST1, the amplification transistor ST2, or the output transistor ST3 may be an oxide semiconductor transistor. As an example, the reset transistor ST1 may be an oxide semiconductor transistor, and the amplification transistor ST2 and the output transistor ST3 may be LTPS transistors. However, the present disclosure is not limited thereto. The reset transistor ST1 and the output transistor ST3 may be oxide semiconductor transistors, and the amplification transistor ST2 may be an LTPS transistor.

Also, some of the reset transistor ST1, the amplification transistor ST2, and the output transistor ST3 may be P-type transistors, and the other(s) thereof may be an N-type transistor. As an example, the amplification transistor ST2 and the output transistor ST3 may be P-type transistors, and the reset transistor ST1 may be an N-type transistor. However, the present disclosure is not limited thereto. For example, all of the reset transistor ST1, the amplification transistor ST2, and the output transistor ST3 may be N-type transistors or P-type transistors.

The circuit configuration of the sensor driving circuit O_SD according to the present disclosure is not limited to that illustrated in FIG. 5. The sensor driving circuit O_SD illustrated in FIG. 5 is provided as an example, and the configuration of the sensor driving circuit O_SD may be variously modified and implemented as needed or desired.

The reset transistor ST1 includes a first electrode that is connected to the third initialization voltage line VL5 and receives the reset voltage Vrst, a second electrode connected with the first sensing node SN1, and a third electrode for receiving a reset control signal RST. The reset transistor ST1 may reset a potential of the first sensing node SN1 to the reset voltage Vrst in response to the reset control signal RST. The reset control signal RST may be a signal provided through the reset control line RCL. However, the present disclosure is not limited thereto. As another example, the reset control signal RST may be the j-th compensation scan signal SCj supplied through the j-th compensation scan line SCLj. In other words, the reset transistor ST1 may receive the j-th compensation scan signal SCj, which is supplied through the j-th compensation scan line SCLj, as the reset control signal RST. As an example, during at least the activation period of the reset control signal RST, the reset voltage Vrst may have a voltage level lower than that of the second driving voltage ELVSS. The reset voltage Vrst may be a DC voltage maintained at a voltage level lower than that of the second driving voltage ELVSS. For example, the reset voltage Vrst may be −4.5 V.

The amplification transistor ST2 includes a first electrode for receiving a sensing driving voltage Vcom, a second electrode connected with a second sensing node SN2, and a third electrode connected with the first sensing node SN1. The amplification transistor ST2 may be turned on in response to the potential of the first sensing node SN1, and may apply the sensing driving voltage Vcom to the second sensing node SN2. As an example, the sensing driving voltage Vcom may correspond to one of the first driving voltage ELVDD, the first initialization voltage VINT1, or the second initialization voltage VINT2. When the sensing driving voltage Vcom corresponds to the first driving voltage ELVDD, the first electrode of the amplification transistor ST2 may be electrically connected with the first driving voltage line VL1. When the sensing driving voltage Vcom corresponds to the first initialization voltage VINT1, the first electrode of the amplification transistor ST2 may be electrically connected with the first initialization voltage line VL3. When the sensing driving voltage Vcom corresponds to the second initialization voltage VINT2, the first electrode of the amplification transistor ST2 may be electrically connected with the second initialization voltage line VL4.

The output transistor ST3 includes a first electrode connected to the second sensing node SN2, a second electrode connected to the d-th readout line RLd, and a third electrode for receiving an output control signal. The output transistor ST3 may deliver a detection signal FSd to the d-th readout line RLd in response to the output control signal. The output control signal may be the j-th operation scan signal SSj supplied through the j-th operation scan line SSLj. In other words, the output transistor ST3 may receive the j-th operation scan signal SSj supplied from the operation scan line SSLj as an output control signal.

The light sensing unit LSU of the sensor FX may be exposed to light during an emission period of the light emitting elements ED_R, ED_G1, ED_G2, and ED_B. The light may be light output from at least one of the light emitting elements ED_R, ED_G1, ED_G2, and ED_B.

When a user's hand US_F (e.g., see FIG. 1) touches a display surface, the first and second light sensing elements OPD1 and OPD2 may generate photocharges corresponding to light reflected by a ridge of a fingerprint or a valley between ridges of the fingerprint, and the generated photocharges may be accumulated in the first sensing node SN1.

The amplification transistor ST2 may be a source follower amplifier for generating a source-drain current in proportion to the charge amount of the first sensing node SN1 input to the third electrode of the amplification transistor ST2.

The j-th operation scan signal SSj of a low level is supplied to the output transistor ST3 through the j-th operation scan line SSLj. When the output transistor ST3 is turned on in response to the j-th operation scan signal SSj of the low level, the detection signal FSd corresponding to a current flowing through the amplification transistor ST2 may be output to the d-th readout line RLd.

For example, a scan frequency at a point in time when the sensor FX senses a fingerprint may be 120 Hz, and a scan frequency at a point in time when the sensor FX senses coordinates for a touch input may be 240 Hz. Accordingly, the j-th operation scan signal SSj provided when the sensor FX senses a fingerprint may be different from a the j-th operation scan signal SSj provided when the sensor FX senses coordinates for a touch input.

When the reset control signal RST of a high level is supplied through the reset control line RCL, the reset transistor ST1 is turned on. A reset period may be defined as an activation period (e.g., a high-level period) of the reset control line RCL. As another example, when the reset transistor ST1 is a PMOS transistor, the reset control signal RST of a low level may be supplied to the reset control line RCL during the reset period. During the reset period, a potential of the first sensing node SN1 may be reset to a potential corresponding to the reset voltage Vrst. As an example, the reset voltage Vrst may have a lower voltage level than that of the second driving voltage ELVSS.

When the reset period ends, the light sensing unit LSU generates photocharges corresponding to the received light, and the generated photocharges may be accumulated in the first sensing node SN1.

Figure 6:
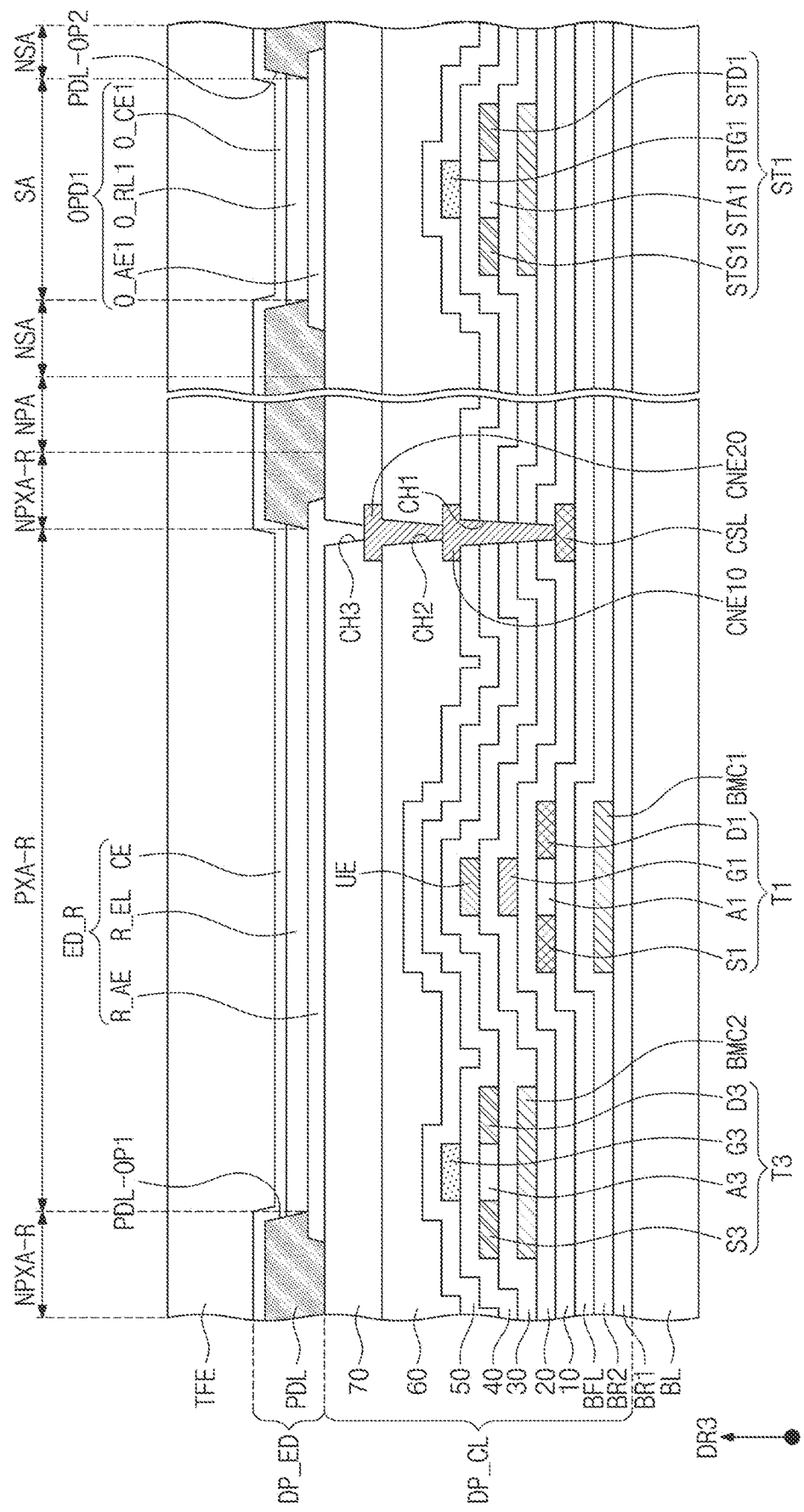
FIG. 6 is a cross-sectional view of a display panel, according to an embodiment of the present disclosure.

FIG. 6 is a cross-sectional view of the display panel DP, according to an embodiment of the present disclosure. For example, the cross-section shown in FIG. 6 may correspond to a cross-section taken along the line I-I' shown in FIG. 4A.

Referring to FIGS. 4A and 6, the display panel DP may include the base layer BL, the circuit layer DP_CL disposed on the base layer BL, the element layer DP_ED, and the encapsulation layer TFE.

The base layer BL may include a synthetic resin layer. The synthetic resin layer may include a thermosetting resin. In more detail, the synthetic resin layer may be a polyimide-based resin layer, but the material thereof is not particularly limited thereto. The synthetic resin layer may include at least one of an acrylate-based resin, a methacrylate-based resin, polyisoprene, a vinyl-based resin, an epoxy-based resin, a urethane-based resin, a cellulose-based resin, a siloxane-based resin, a polyamide-based resin, or a perylene-based resin. The base layer BL may include a glass substrate, a metal substrate, an organic/inorganic composite substrate, or the like.

At least one inorganic layer is formed on an upper surface of the base layer BL. The inorganic layer may include at least one of aluminum oxide, titanium oxide, silicon oxide, silicon oxynitride, zirconium oxide, or hafnium oxide. The inorganic layer may be formed of multiple layers. The multi-layered inorganic layers may constitute barrier layers BR1 and BR2 and/or a buffer layer BFL, which will be described in more detail below. The barrier layers BR1 and BR2 and the buffer layer BFL may be selectively disposed.

The barrier layers BR1 and BR2 prevent or substantially prevent foreign objects from being introduced from the outside. The barrier layers BR1 and BR2 may include a silicon oxide layer and a silicon nitride layer. Each of the silicon oxide layer and the silicon nitride layer may include a plurality of layers, and the silicon oxide layers and the silicon nitride layers may be alternately stacked.

The barrier layers BR1 and BR2 may include the first barrier layer BR1 and the second barrier layer BR2. A first back metal layer BMC1 may be interposed between the first barrier layer BR1 and the second barrier layer BR2. In an embodiment of the present disclosure, the first back metal layer BMC1 may be omitted.

The buffer layer BFL may be disposed on the barrier layers BR1 and BR2. The buffer layer BFL improves a bonding force between the base layer BL and a semiconductor pattern and/or a conductive pattern. The buffer layer BFL may include a silicon oxide layer and a silicon nitride layer. The silicon oxide layer and the silicon nitride layer may be alternately stacked.

A first semiconductor pattern may be disposed on the buffer layer BFL. The first semiconductor pattern may include a silicon semiconductor. For example, the silicon semiconductor may include amorphous silicon or polycrystalline silicon. For example, the first semiconductor pattern may include low-temperature polysilicon.

FIG. 6 illustrates a portion of the first semiconductor pattern that is disposed on the buffer layer BFL. Another portion of the first semiconductor pattern may be further disposed in another area. The first semiconductor pattern may be arranged across pixels in a suitable rule (e.g., a specific or predetermined rule). The first semiconductor pattern may have electrical characteristics that are different depending on whether or not the first semiconductor pattern is doped. The first semiconductor pattern may include a first area having high conductivity, and a second area having low conductivity. The first area may be doped with an N-type dopant or a P-type dopant. A P-type transistor may include a doping area doped with the P-type dopant, and an N-type transistor may include a doping area doped with the N-type dopant. The second area may be an undoped area or an area doped with a concentration lower than a concentration of the first area.

The conductivity of the first area is greater than the conductivity of the second area. The first area may serve or substantially serve as an electrode or a signal line. The second area may correspond to or substantially correspond to an active area (e.g., a channel) of a transistor. In other words, a part of the semiconductor pattern may be an active area of the transistor. Another part thereof may be a source or drain of the transistor. Another part thereof may be a connection electrode or a connection signal line.

A first electrode S1, a channel part A1, and a second electrode D1 of the first transistor T1 are formed from the first semiconductor pattern. The first electrode S1 and the second electrode D1 of the first transistor T1 extend in opposite directions from each other from the channel part A1.

A portion of a connection signal line CSL formed from the first semiconductor pattern is illustrated in FIG. 6. The connection signal line CSL may be electrically connected to the second electrode of the fifth transistor T5 (e.g., see FIG. 5) on a plane (e.g., in a plan view).

A first insulating layer 10 may be disposed on the buffer layer BFL. The first insulating layer 10 may overlap with a plurality of pixels in common, and may cover the first semiconductor pattern. The first insulating layer 10 may be an inorganic layer and/or an organic layer, and may have a single layer or multi-layered structure. The first insulating layer 10 may include at least one of aluminum oxide, titanium oxide, silicon oxide, silicon nitride, silicon oxynitride, zirconium oxide, or hafnium oxide. In an embodiment, the first insulating layer 10 may be a single silicon oxide layer. An insulating layer of the circuit layer DP_CL, which is to be described in more detail below, as well as the first insulating layer 10, may be an inorganic layer and/or an organic layer, and may have a single layer structure or a multi-layered structure. The inorganic layer may include at least one of the above-described materials, but is not limited thereto.

A third electrode G1 of the first transistor T1 is disposed on the first insulating layer 10. The third electrode G1 may be a portion of a metal pattern. The third electrode G1 of the first transistor T1 overlaps with the channel part A1 of the first transistor T1. In a process of doping the first semiconductor pattern, the third electrode G1 of the first transistor T1 may function as a mask. The third electrode G1 may include, but is not limited to, titanium (Ti), silver (Ag), an alloy containing silver (Ag), molybdenum (Mo), an alloy containing molybdenum (Mo), aluminum (Al), an alloy containing aluminum (Al), aluminum nitride (AlN), tungsten (W), tungsten nitride (WN), copper (Cu), indium tin oxide (ITO), indium zinc oxide (IZO), or the like.

A second insulating layer 20 may be disposed on the first insulating layer 10, and may cover the third electrode G1 of the first transistor T1. The second insulating layer 20 may be an inorganic layer and/or an organic layer, and may have a single layer structure or a multi-layered structure. The second insulating layer 20 may include at least one of silicon oxide, silicon nitride, or silicon oxynitride. In an embodiment, the second insulating layer 20 may have a multi-layered structure including a silicon oxide layer and a silicon nitride layer.

An upper electrode UE and a second back metal layer BMC2 may be disposed on the second insulating layer 20. The upper electrode UE may overlap with the third electrode G1. The upper electrode UE may be a portion of a metal pattern. A portion of the third electrode G1 and the upper electrode UE overlapping with the portion of the third electrode G1 may define the capacitor Cst (e.g., see FIG. 5). In an embodiment of the present disclosure, the second insulating layer 20 may be replaced with an insulating pattern. In this case, the upper electrode UE may be disposed on an insulating pattern, and the upper electrode UE may serve as a mask for forming an insulating pattern from the second insulating layer 20.

The second back metal layer BMC2 may be disposed to correspond to a lower portion of an oxide thin film transistor (e.g., the third transistor T3). The second back metal layer BMC2 may receive a constant or substantially constant voltage or a signal.

A third insulating layer 30 may be disposed on the second insulating layer 20, and may cover the upper electrode UE and the second back metal layer BMC2. The third insulating layer 30 may have a single-layer or multi-layered structure. For example, the third insulating layer 30 may have a multi-layered structure including a silicon oxide layer and a silicon nitride layer.

A second semiconductor pattern may be disposed on the third insulating layer 30. The second semiconductor pattern may include an oxide semiconductor. The oxide semiconductor may include a plurality of areas that are distinguished from one another depending on whether or not a metal oxide is reduced. An area (hereinafter referred to as a "reduction area") in which the metal oxide is reduced has higher conductivity than that of an area (hereinafter referred to as a "non-reduction area") in which the metal oxide is not reduced. The reduction area serves or substantially serves as a source area/drain area of the transistor or a signal line. The non-reduction area corresponds to an active area (alternatively, a semiconductor area or a channel) of a transistor. In other words, a part of the second semiconductor pattern may be the active area of a transistor, another part thereof may be the source/drain area of the transistor, and another part thereof may be a signal transmission area.

A first electrode S3, a channel part A3, and a second electrode D3 of the third transistor T3 are formed from the second semiconductor pattern. The first electrode S3 and the second electrode D3 include a metal reduced from a metal oxide semiconductor. The first electrode S3 and the second electrode D3 may extend in directions opposite to each other from the channel part A3 on a cross section (e.g., in a cross-sectional view).

A fourth insulating layer 40 may be disposed on the third insulating layer 30. The fourth insulating layer 40 may overlap with a plurality of pixels in common, and may cover the second semiconductor pattern. The fourth insulating layer 40 may include at least one of an aluminum oxide, a titanium oxide, a silicon oxide, a silicon nitride, a silicon oxynitride, a zirconium oxide, or a hafnium oxide.

The third electrode G3 of the third transistor T3 is disposed on the fourth insulating layer 40. The third electrode G3 may be a portion of a metal pattern. The third electrode G3 of the third transistor T3 overlaps with the channel part A3 of the third transistor T3. The third electrode G3 may function as a mask in a process of doping the second semiconductor pattern. In an embodiment of the present disclosure, the fourth insulating layer 40 may be replaced with an insulating pattern.

A fifth insulating layer 50 may be disposed on the fourth insulating layer 40, and may cover the third electrode G3. The fifth insulating layer 50 may be an inorganic layer.

A first connection electrode CNE10 may be disposed on the fifth insulating layer 50. The first connection electrode CNE10 may be connected to the connection signal line CSL through a first contact hole CH1 penetrating the first to fifth insulating layers 10, 20, 30, 40, and 50.

A sixth insulating layer 60 may be disposed on the fifth insulating layer 50. The sixth insulating layer 60 may be an organic layer. The organic layer may include one or more general purpose polymers, such as benzocyclobutene (BCB), polyimide, hexamethyldisiloxane (HMDSO), polymethylmethacrylate (PMMA), or polystyrene (PS), a polymer derivative having a phenolic group, an acrylic polymer, an imide-based polymer, an aryl ether-based polymer, an amide-based polymer, a fluorine-based polymer, a p-xylene-based polymer, a vinyl alcohol-based polymer, and/or a suitable blend thereof, but is not particularly limited thereto.

A second connection electrode CNE20 may be disposed on the fifth insulating layer 60. The second connection electrode CNE20 may be connected to the first connection electrode CNE10 through a second contact hole CH2 penetrating the sixth insulating layer 60. A seventh insulating layer 70 may be disposed on the sixth insulating layer 60, and may cover the second connection electrode CNE20. The seventh insulating layer 70 may be an organic layer.

A first electrode layer is disposed on the circuit layer DP_CL. A pixel defining layer PDL is formed on the first electrode layer. The first electrode layer may include the red, green, and blue anodes R_AE, G_AE1, and B_AE, and the first anode O_AE1. The red, green, and blue anodes R_AE, G_AE1, and B_AE, and the first anode O_AE1 are disposed on the seventh insulating layer 70. The red anode R_AE may be connected to the second connection electrode CNE20 through a third contact hole CH3 penetrating the seventh insulating layer 70.

First and second film openings PDL-OP1 and PDL-OP2 are provided in the pixel defining layer PDL. The first film openings PDL-OP1 expose at least parts of the red anode R_AE, the green anode G_AE1, and the blue anode B_A3, respectively. The second film opening PDL-OP2 exposes at least part of the first anode O_AE1.

In an embodiment of the present disclosure, the pixel defining layer PDL may further include a black material. The pixel defining layer PDL may further include a black organic dye/pigment, such as carbon black, aniline black, or the like. The pixel defining layer PDL may be formed by mixing a blue organic material and a black organic material with each other. The pixel defining layer PDL may further include a liquid-repellent organic material.

As shown in FIG. 6, the display panel DP may include a second emission area PXA-R, and a non-emission area NPXA-R adjacent to the second emission area PXA-R. The display panel DP may further include a green emission area and a blue emission area respectively overlapping with the green anode G_AE1 and the blue anode B_A3. The non-emission area NPXA-R may surround (e.g., around a periphery of) the second emission area PXA-R. In an embodiment, the second emission area PXA-R is defined to correspond to a partial area of the red anode R_AE exposed by the first film opening PDL-OP1.

A light emitting layer may be disposed on a first electrode layer. The light emitting layer may include the red, green, and blue light emitting layers R_EL, G1_EL, G2_EL, and B_EL. The red, green, and blue light emitting layers R_EL, G1_EL, G2_EL, and B_EL may be disposed in areas corresponding to the first film openings PDL-OP1, respectively. The red, green, and blue light emitting layers R_EL, G1_EL, G2_EL, and B_EL may be separately formed in the red, green, and blue pixels PXR, PXG1, PXG2, and PXB, respectively. Each of the red, green, and blue light emitting layers R_EL, G1_EL, G2_EL, and B_EL may include an organic material and/or an inorganic material. The red, green, and blue light emitting layers R_EL, G1_EL, G2_EL, and B_EL may generate light of a desired color (e.g., a predetermined color). For example, the red light emitting layer R_EL may generate red light, the green light emitting layers G1_EL and G2_EL may generate green light, and the blue light emitting layer B_EL may generate blue light.

In an embodiment, patterned red, green, and blue light emitting layers R_EL, G1_EL, G2_EL, and B_EL are described. However, one light emitting layer may be commonly disposed in a plurality of emission areas. In this case, the light emitting layer may generate white light or blue light. Also, the light emitting layer may have a multi-layered structure that is referred to as "tandem".

Each of the red, green, and blue light emitting layers R_EL, G1_EL, G2_EL, and B_EL may include a low-molecular organic material or a high-molecular organic material as a light emitting material. As another example, each of the red, green, and blue light emitting layers R_EL, G1_EL, G2_EL, and B_EL may include a quantum dot material as a light emitting material. The core of a quantum dot may be selected from among a group II-VI compound, a group III-V compound, a group IV-VI compound, a group IV element, a group IV compound, and a combination thereof.

A cathode CE is disposed on the red, green, and blue light emitting layers R_EL, G1_EL, G2_EL, and B_EL. As an example, the cathode CE may be commonly disposed in the emission areas PXA-R, PXA-G, and PXA-B, the non-emission area NPXA-R, and a non-pixel area NPA.

The circuit layer DP_CL may further include the sensor driving circuit O_SD (e.g., see FIG. 5). For convenience of illustration, the reset transistor ST1 of the sensor driving circuit O_SD is shown. A first electrode STS1, a channel part STA1, and a second electrode STD1 of the reset transistor ST1 are formed from the second semiconductor pattern. The first electrode STS1 and the second electrode STD1 include a metal reduced from a metal oxide semiconductor. The fourth insulating layer is disposed to cover the first electrode STS1, the channel part STA1, and the second electrode STD1 of the reset transistor ST1. A third electrode STG1 of the reset transistor ST1 is disposed on the fourth insulating layer 40. In an embodiment, the third electrode STG1 may be a part of the metal pattern. The third electrode STG1 of the reset transistor ST1 overlaps with the channel part STA1 of the reset transistor ST1.

In an embodiment of the present disclosure, the reset transistor ST1 may be disposed at (e.g., in or on) the same layer as that of the third transistor T3. In other words, the first electrode STS1, the channel part STA1, and the second electrode STD1 of the reset transistor ST1 may be formed through a process that is the same as that of the first electrode S3, the channel part A3, and the second electrode D3 of the third transistor T3. The third electrode STG1 of the reset transistor ST1 may be concurrently (e.g., simultaneously or substantially simultaneously) formed through the same process with the third electrode G3 of the third transistor T3. The first electrode and the second electrode of each of the amplification transistor ST2 and the output transistor ST3 of the sensor driving circuit O_SD may be formed through the same process as that of the first electrode S1 and the second electrode D1 of the first transistor T1. The reset transistor ST1 and the third transistor T3 may be formed at (e.g., in or on) the same layer as each other through the same process. Accordingly, because an additional process of forming the reset transistor ST1 is not used, process efficiency may be improved and costs may be reduced.

The element layer DP_ED may further include the first and second light sensing elements OPD1 and OPD2 (e.g., see FIG. 5). FIG. 6 shows the first light sensing element OPD1 for convenience of illustration.

The first light sensing element OPD1 may include the first anode O_AE1, the first photoelectric conversion layer O_RL1, and a first cathode O_CE1. The first anode O_AE1 may be disposed at (e.g., in or on) the same layer as that of the first electrode layer. In other words, the first anode O_AE1 may be disposed on the circuit layer DP_CL, and may be concurrently (e.g., simultaneously or substantially simultaneously) formed through the same process with the red, green, and blue anodes R_AE, G1_AE, and B_AE.

The second film opening PDL-OP2 of the pixel defining layer PDL exposes at least a part of the first anode O_AE1. The first photoelectric conversion layer O_RL1 is disposed on the first anode O_AE1 exposed by the second film opening PDL-OP2. The first photoelectric conversion layer O_RL1 may include an organic photo-sensing material. The first cathode O_CE1 may be disposed on the first photoelectric conversion layer O_RL1. The first cathode O_CE1 may be concurrently (e.g., simultaneously or substantially simultaneously) formed through the same process with the cathode CE. As an example, the first cathode O_CE1 may be integrated (e.g., integrally formed) with the cathode CE.

Each of the first anode O_AE1 and the first cathode O_CE1 may receive an electrical signal. The first cathode O_CE1 may receive a signal different from that of the first anode O_AE1. Accordingly, an electric field (e.g., a predetermined electric field) may be formed between the first anode O_AE1 and the first cathode O_CE1. The first photoelectric conversion layer O_RL1 generates an electrical signal corresponding to the light incident on the sensor FX. The first photoelectric conversion layer O_RL1 may generate charges by absorbing the energy of the incident light. For example, the first photoelectric conversion layer O_RL1 may include a light-sensitive semiconductor material.

The charges generated by the first photoelectric conversion layer O_RL1 change an electric field between the first anode O_AE1 and the first cathode O_CE1. The amount of charges generated by the first photoelectric conversion layer O_RL1 may vary depending on whether or not light is incident onto the first light sensing element OPD1, the amount of light incident onto the first light sensing element OPD1, or the intensity of light incident onto the first light sensing element OPD1. Accordingly, the electric field formed between the first anode O_AE1 and the first cathode O_CE1 may be changed. The first light sensing element OPD1 according to an embodiment of the present disclosure may obtain fingerprint information of a user or coordinate information by a touch input through a change in the electric field between the first anode O_AE1 and the first cathode O_CE1.

However, the present disclosure is not limited thereto. The first light sensing element OPD1 may include a phototransistor that uses a first photoelectric conversion layer O_RL1 as an active layer. In this case, the first light sensing element OPD1 may obtain fingerprint information by sensing the amount of current flowing through the phototransistor. The first light sensing element OPD1 according to an embodiment of the present disclosure may include various suitable photoelectric conversion elements capable of generating electrical signals in response to a change in the amount of light, but the present disclosure is not limited thereto.

The encapsulation layer TFE is disposed on the element layer DP_ED. The encapsulation layer TFE includes at least one inorganic layer and/or at least one organic layer. In an embodiment of the present disclosure, the encapsulation layer TFE may include two inorganic layers, and an organic layer disposed therebetween. In an embodiment of the present disclosure, a thin film encapsulation layer may include a plurality of inorganic layers and a plurality of organic layers, which are alternately stacked.

The encapsulation inorganic layer protects the red, green, and blue light emitting elements ED_R, ED_G1, and ED_B, and the first light sensing element OPD1 from moisture/oxygen. The encapsulation organic layer protects the red, green, and blue light emitting elements ED_R, ED_G1, and ED_B, and the first light sensing element OPD1 from foreign substances. The encapsulation inorganic layer may include a silicon nitride layer, a silicon oxynitride layer, a silicon oxide layer, a titanium oxide layer, an aluminum oxide layer, or the like, but is not specifically limited thereto. The encapsulation organic layer may include an acryl-based organic layer, but is not specifically limited thereto.

Figure 7A:
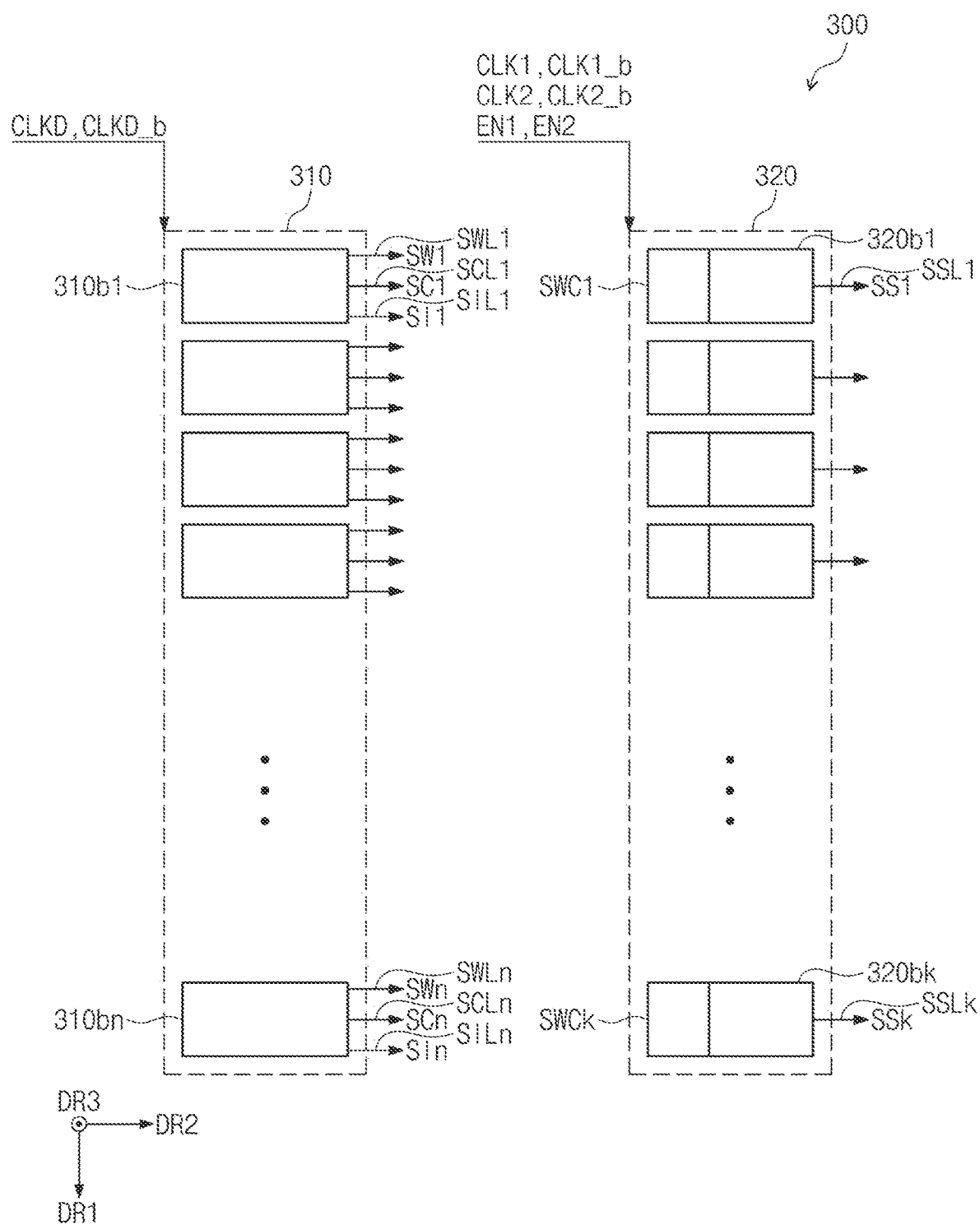
FIG. 7A is a block diagram of a scan driver, according to an embodiment of the present disclosure.

FIG. 7A is a block diagram of a scan driver, according to an embodiment of the present disclosure.

Referring to FIGS. 5 and 7A, the scan driver 300 may include a first driver 310 and a second driver 320.

The first driver 310 may provide initialization scan signals SI1 to SIn, compensation scan signals SC1 to SCn, and write scan signals SW1 to SWn to the pixel driving circuits R_PD. The black scan signal SBj may be a write scan signal. For example, the j-th black scan signal SBj may be a (j−1)-th write scan signal. From among these, the write scan signals SW1 to SWn are referred to as "first scan signals". The second driver 320 may output operation scan signals SS1 to SSk to the sensor driving circuit O_SD. The operation scan signals SS1 to SSk are referred to as "second scan signals".

The first driver 310 may operate at a first operating frequency (e.g., a first scan frequency or a first vertical frequency). The second driver 320 may operate at a second operating frequency (e.g., a second scan frequency or a second vertical frequency) or a third operating frequency (e.g., a third scan frequency or a third vertical frequency). For example, each of the first operating frequency and the second operating frequency may be 120 Hz. The third operating frequency may be equal to or higher than the second operating frequency. In an embodiment of the present disclosure, the third operating frequency may be 240 Hz. For example, clock signals CLKD and CLKD_b of the first operating frequency may be provided to the first driver 310, and first clock signals CLK1 and CLK1_b of the second operating frequency and second clock signals CLK2 and CLK2_b of the third operating frequency may be provided to the second driver 320.

The clock signals CLKD and CLKD_b may include the clock signal CLKD and the shift clock signal CLKD_b, which has the same period as that of the clock signal CLKD and is shifted by half the period of the clock signal CLKD. For example, the frequency of each of the clock signals CLKD and CLKD_b may be 120 Hz.

The first clock signals CLK1 and CLK1_b may include the first clock signal CLK1 and the first shift clock signal CLK1_b. The first clock signal CLK1 and the first shift clock signal CLK1_b may be signals having the same period as each other. For example, the first shift clock signal CLK1_b may be a signal shifted by half the period of the first clock signal CLK1. The frequency of each of the first clock signals CLK1 and CLK1_b may be 120 Hz.

The second clock signals CLK2 and CLK2_b may include the second clock signal CLK2 and the second shift clock signal CLK2_b. The second clock signal CLK2 and the second shift clock signal CLK2_b may be signals having the same period as each other. For example, the second shift clock signal CLK2_b may be a signal shifted by half the period of the second clock signal CLK2. The frequency of each of the second clock signals CLK2 and CLK2_b may be 240 Hz.

The first driver 310 may include a plurality of first driving stages 310b1 to 310bn (where 'n' is a positive integer greater than or equal to 2). The second driver 320 may include a plurality of second driving stages 320b1 to 320bk and a plurality of switch circuits SWC1 to SWCk (where 'k' is a positive integer greater than or equal to 2). The plurality of switch circuits SWC1 to SWCk may control delivery of the first clock signals CLK1 and CLK1_b of the second operating frequency or the second clock signals CLK2 and CLK2_b of the third operating frequency.

Each of the plurality of first driving stages 310b1 to 310bn included in the first driver 310 operating at the first operating frequency may output scan signals 120 times per second. When the second driver 320 operates at the second operating frequency, each of the plurality of second driving stages 320b1 to 320bk may output scan signals 120 times per second. When the second driver 320 operates at the third operating frequency, each of at least some of the plurality of second driving stages 320b1 to 320bk may output scan signals 240 times per second. The operating frequency of the second driver 320 may be changed depending on a first sensing mode for sensing a fingerprint or a second sensing mode for sensing a touch input. Accordingly, input coordinates by a fingerprint and a touch may be sensed by using the common sensors FX.

In an embodiment of the present disclosure, the number of the plurality of second driving stages 320b1 to 320bk may be the same as the number of the plurality of switch circuits SWC1 to SWCk. Accordingly, the plurality of second driving stages 320b1 to 320bk may be electrically connected to the plurality of switch circuits SWC1 to SWCk, respectively.

According to an embodiment of the present disclosure, the first driver 310 for displaying an image is separated from the second driver 320 for fingerprint and touch sensing. Accordingly, an influence of a change in a display quality according to an operation of the second driver 320 may be reduced.

Moreover, because all the plurality of second driving stages 320b1 to 320bk are connected to the plurality of switch circuits SWC1 to SWCk in a one-to-one correspondence, a load difference of a signal provided to the sensors FX (e.g., see FIG. 3) may be reduced or eliminated. Accordingly, uniformity of the data obtained from the sensors FX (e.g., see FIG. 3) may be improved.

Also, sensors for sensing touches from among the sensors FX may be changed by adjusting the waveform of a second enable signal EN2. Accordingly, the sensors for sensing the touches may be selected more freely.

Figure 7B:
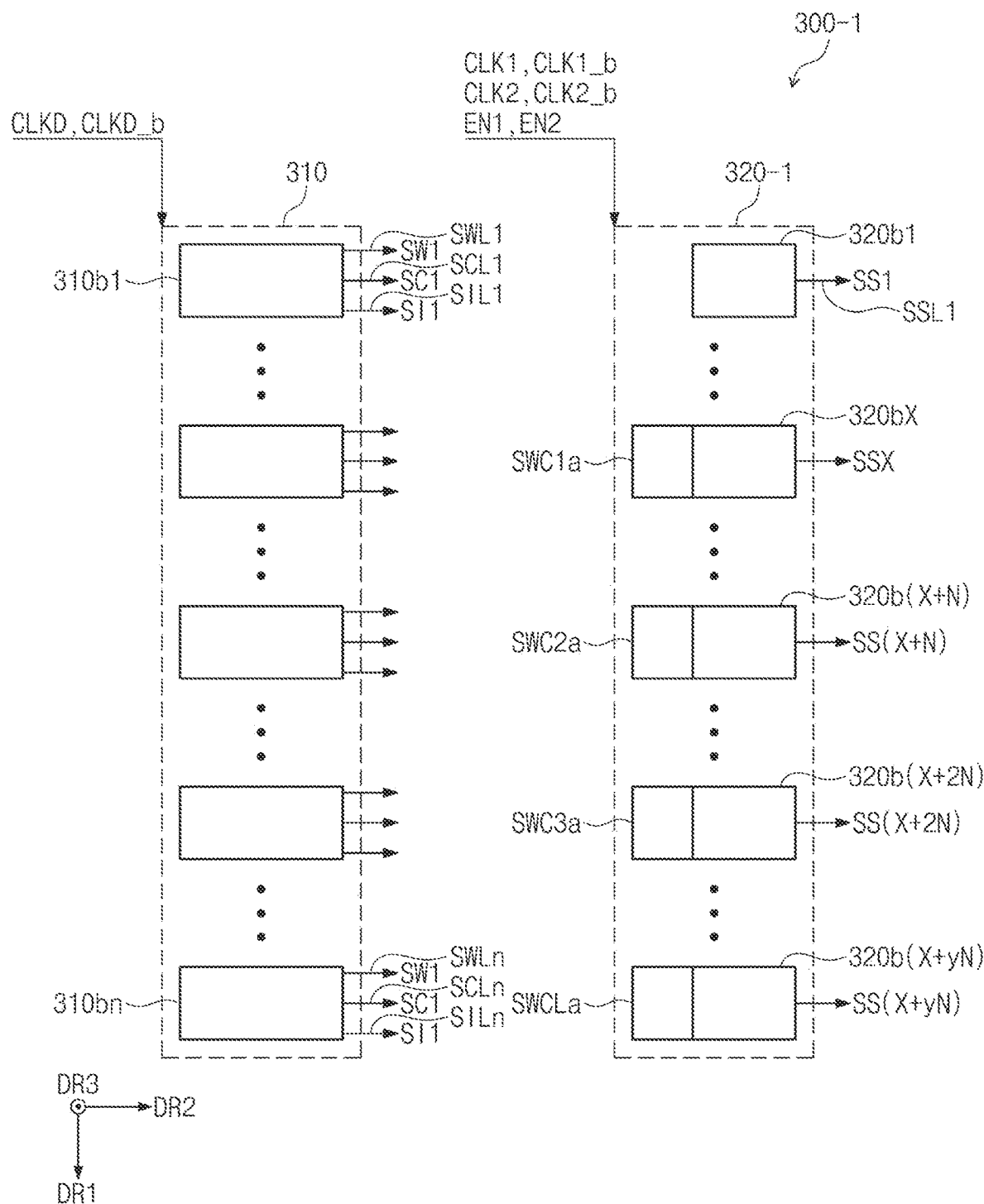
FIG. 7B is a block diagram of a scan driver, according to an embodiment of the present disclosure.

FIG. 7B is a block diagram of a scan driver, according to an embodiment of the present disclosure.

Referring to FIG. 7B, a scan driver 300-1 may include the first driver 310 and a second driver 320-1.

In an embodiment of the present disclosure, the number of the second driving stages 320b1 to 320b(X+yN)) (where 'X' is a constant, 'N' is a constant, and 'y' is an integer greater than or equal to 0) may be greater than the number of the switch circuits SWC1a to SWCLa (where 'L' is a positive integer greater than or equal to 2).

The plurality of second driving stages 320b1 to 320b(X+yN) may be sequentially arranged along the first direction DR1. The plurality of switch circuits SWC1a to SWCLa may include a first switch circuit SWC1a connected to the X-th second driving stage 320bX from among the plurality of second driving stages 320b1 to 320b(X+yN), a second switch circuit SWC2a connected to the (X+N)-th second driving stage 320b(X+N) from among the plurality of second driving stages 320b1 to 320b(X+yN), and a third switch circuit SWC3a connected to the (X+2N)-th second driving stage 320b(X+2N) from among the plurality of second driving stages 320b1 to 320bk.

The second driving stages connected to the plurality of switch circuits SWC1a to SWCLa may receive the first clock signals CLK1 and CLK1_b of the second operating frequency or the second clock signals CLK2 and CLK2_b of the third operating frequency, depending on a sensing mode. The remaining second driving stages that are not connected to the plurality of switch circuits SWC1a to SWCLa may receive the first clock signals CLK1 and CLK1_b of the second operating frequency. In other words, the sensors FX (e.g., see FIG. 3) receiving operation scan signals SSX, SS(X+N), and SS(X+2N) from the second driving stages connected to the plurality of switch circuits SWC1a to SWCLa may operate to sense a fingerprint or to sense touch location coordinates.

According to an embodiment of the present disclosure, the first driver 310 for displaying an image is separated from the second driver 320 for fingerprint and touch sensing. Accordingly, an influence of a change in a display quality according to an operation of the second driver 320 may be reduced. Furthermore, the length of 1 horizontal period (1H) in a second sensing mode for sensing input coordinates by a touch may be adjusted. In other words, flexibility during touch driving may be improved. Further, because the plurality of switch circuits SWC1a to SWCLa may be provided to only desired portions, dead space may be reduced as compared to the embodiment described above with reference to FIG. 7A.

Figure 8:
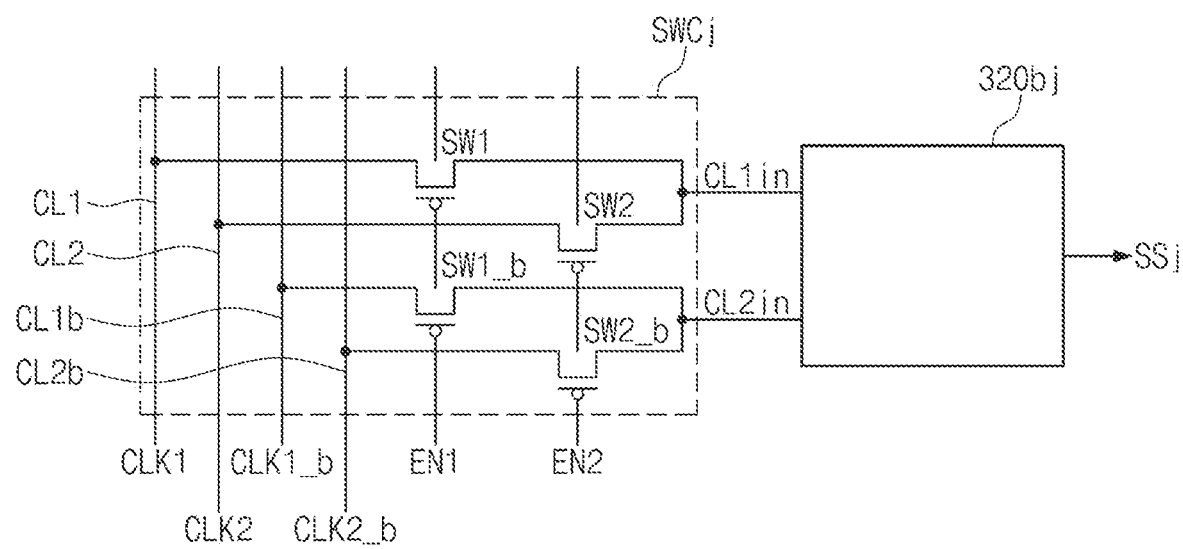
FIG. 8 is a diagram showing a switch circuit and one driving stage connected the switch circuit, according to an embodiment of the present disclosure.

FIG. 8 is a diagram showing a switch circuit and one driving stage connected to the switch circuit, according to an embodiment of the present disclosure.

Referring to FIGS. 7A, 7B, and 8, one second driving stage 320*bj* and one switch circuit SWCj connected thereto are illustrated. Because the remaining switch circuits may have the same or substantially the same equivalent circuit as that of the switch circuit SWCj shown in FIG. 8, redundant description thereof may not be repeated.

The first clock signal CLK1, the second clock signal CLK2, the first shift clock signal CLK1_*b*, the second shift clock signal CLK2_*b*, a first enable signal EN1, and the second enable signal EN2 may be provided to the switch circuit SWCj.

The switch circuit SWCj may include a first switch SW1, a second switch SW2, a first shift switch SW1_*b*, and a second shift switch SW2_*b*.

The first switch SW1 may be connected to a first clock line CL1 provided with the first clock signal CLK1, and an operation of the first switch SW1 may be controlled by the first enable signal EN1. The first shift switch SW1_*b* may be connected to a first shift clock line CL1*b* provided with the first shift clock signal CLK1_*b*, and an operation of the first shift switch SW1_*b* may be controlled by the first enable signal EN1.

The second switch SW2 may be connected to a second clock line CL2 provided with the second clock signal CLK2, and an operation of the second switch SW2 may be controlled by the second enable signal EN2. The second shift switch SW2_*b* may be connected to a second shift clock line CL2*b* provided with the second shift clock signal CLK2_*b*, and an operation of the second shift switch SW2_*b* may be controlled by the second enable signal EN2.

Figure 9:
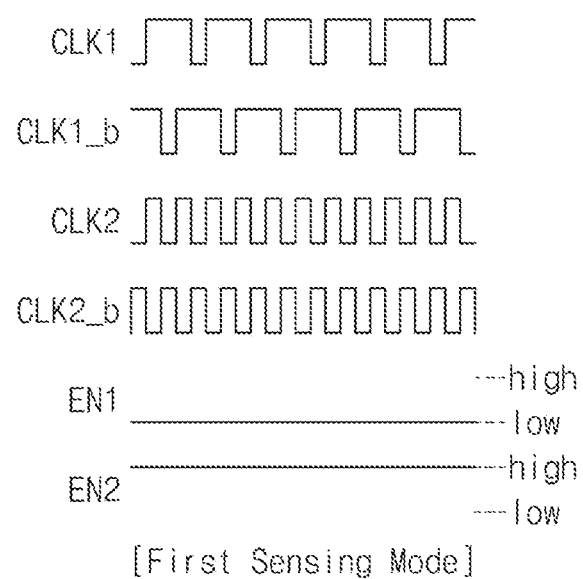
FIG. 9 is a waveform diagram illustrating an operation of the switch circuit shown in FIG. 8 in a first sensing mode.

FIG. 9 is a waveform diagram illustrating an operation of the switch circuit shown in FIG. 8 in a first sensing mode.

Referring to FIGS. 7A, 7B, 8, and 9, in the first sensing mode for sensing a fingerprint, the first enable signal EN1 may be activated, and the second enable signal EN2 may be deactivated. The first switch SW1, the second switch SW2, the first shift switch SW1_*b*, and the second shift switch SW2_*b* may be PMOS transistors. Accordingly, the first enable signal EN1 may have a low level, and the second enable signal EN2 may have a high level.

In the first sensing mode, the first clock signal CLK1 and the first shift clock signal CLK1_*b* operating at 120 Hz may be provided to the second driving stage 320*bj* as a first provision clock signal CL1in and a second provision clock signal CL2in.

Figure 10A:
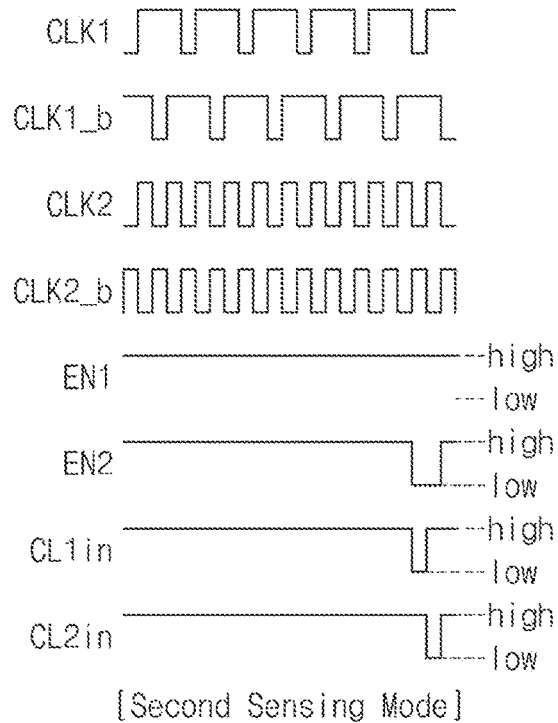
FIG. 10A is a waveform diagram illustrating an operation of the switch circuit shown in FIG. 8 in a second sensing mode.

FIG. 10A is a waveform diagram illustrating an operation of the switch circuit shown in FIG. 8 in a second sensing mode.

Referring to FIGS. 7A, 8, and 10A, in the second sensing mode for sensing an external input, the first enable signal EN1 may be deactivated, and the second enable signal EN2 may be activated during a certain section. For example, to sense input coordinates of an external input, only some second driving stages from among the plurality of second driving stages 320*b*1 to 320*bk* may be used. For example, in the second sensing mode, when only (X+(y*N))-th second driving stages from among the plurality of second driving stages 320*b*1 to 320*bk* are used, the second enable signal EN2 may be activated during only a section where the (X+(y*N))-th second driving stages operate (where 'X' is a constant, 'N' is a constant, and 'y' is an integer greater than or equal to 0).

As described above, when an area where the 20 pixels PX are arranged in each of the first direction DR1 and the second direction DR2 (e.g., see FIG. 3) defines (e.g., is set as) a reference area, 'N' may be equal to 20, and 'X' may be determined as one constant from among positive integers less than or equal to 20.

Figure 10B:
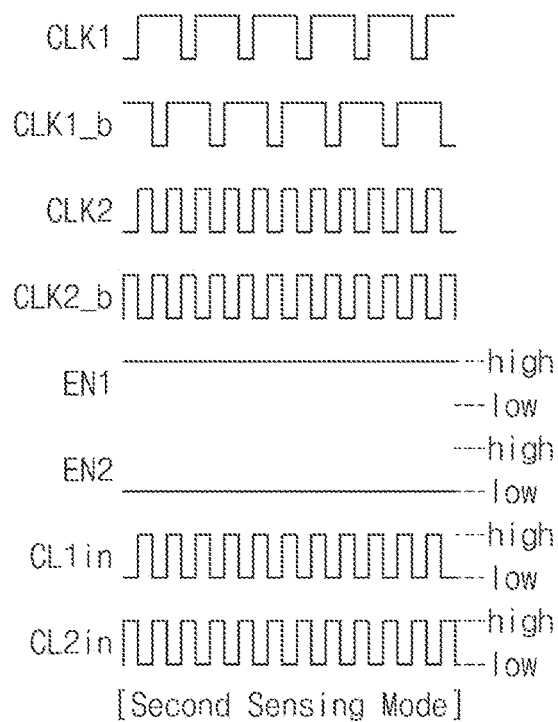
FIG. 10B is a waveform diagram illustrating an operation of the switch circuit shown in FIG. 8 in a second sensing mode.

FIG. 10B is a waveform diagram illustrating an operation of the switch circuit shown in FIG. 8 in a second sensing mode.

Referring to FIGS. 7B, 8, and 10B, in the second sensing mode for sensing an external input, the first enable signal EN1 may be deactivated, and the second enable signal EN2 may be activated.

According to the embodiment shown in FIG. 7B, a switch circuit may be provided to only second driving stages, which are connected to sensors used to sense touch location coordinates, from among the plurality of second driving stages 320*b*1 to 320*bk*. Accordingly, in the second sensing mode, the second enable signal EN2 may maintain an activation level without changing a level.

Figure 11:
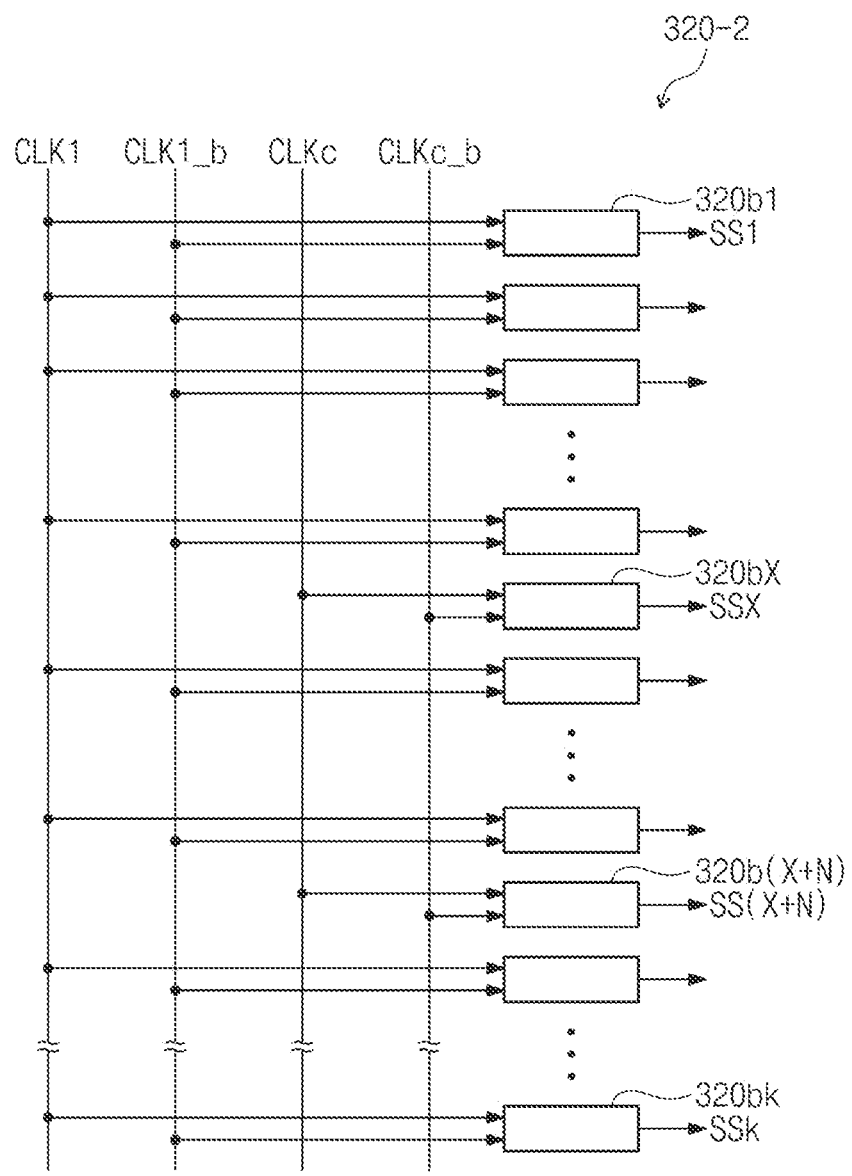
FIG. 11 is a block diagram illustrating a second driver, according to an embodiment of the present disclosure.

FIG. 11 is a block diagram illustrating a second driver, according to an embodiment of the present disclosure.

Referring to FIG. 11, a second driver 320-2 may include the plurality of second driving stages 320*b*1 to 320*bk*. The plurality of second driving stages 320*b*1 to 320*bk* may include a plurality of first sensing driving stages that receive the first clock signal CLK1 and the first shift clock signal CLK1_*b* of the second operating frequency, and a plurality of second sensing driving stages that receive a second clock signal CLKc and a second shift clock signal CLKc_b, the frequency of each of which is changed to the second operating frequency or the third operating frequency.

For example, like the X-th second driving stage 320*b*X or the (X+N)-th second driving stage 320*b*(X+N), the (X+yN)-th second driving stages (where 'X' is a constant, 'N' is a constant, and cy is an integer greater than or equal to 0) may be second sensing driving stages, and the remaining second driving stages other than the (X+yN)-th second driving stages may be first sensing driving stages. The number of first sensing driving stages may be greater than the number of second sensing driving stages. One or more (e.g., N–1) first sensing driving stages may be positioned between the second sensing driving stages 320*b*X and 320*b*(X+N), which are most adjacent to each other.

According to an embodiment of the present disclosure, the second clock signal CLKc and the second shift clock signal CLKc_b, the frequency of each of which is changed to the second operating frequency or the third operating frequency, are provided to the (X+yN)-th second driving stages. For example, in a first sensing mode for sensing a fingerprint, the second clock signal CLKc and the second shift clock signal CLKc_b of the second operating frequency may be provided. In a second sensing mode for sensing an input by a touch, the second clock signal CLKc and the second shift clock signal CLKc_b of the third operating frequency may be provided. However, when the operating frequency of the second driver 320-2 is desired to be adjusted to improve touch accuracy, not touch sensitivity, the second clock signal CLKc and the second shift clock signal CLKc_b of a second operating frequency may be provided in the second sensing mode.

Figure 12:
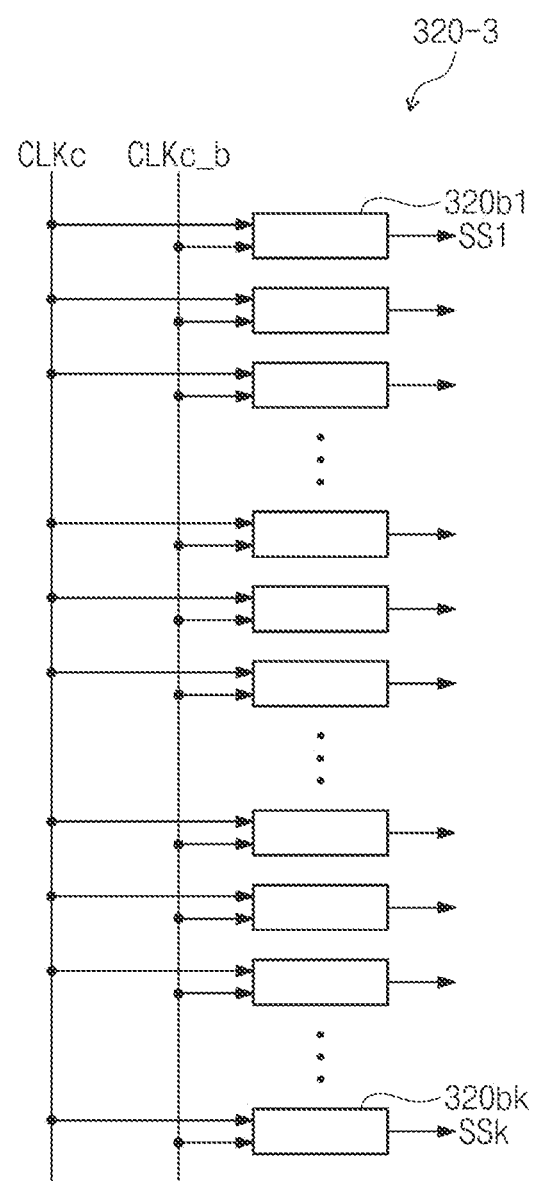
FIG. 12 is a block diagram illustrating a second driver, according to an embodiment of the present disclosure.

FIG. 12 is a block diagram illustrating a second driver, according to an embodiment of the present disclosure.

Referring to FIG. 12, a second driver 320-3 may include the plurality of second driving stages 320*b*1 to 320*bk*. The plurality of second driving stages 320*b*1 to 320*bk* may receive the second clock signal CLKc and the second shift clock signal CLKc_b, the frequency of each of which is changed to the second operating frequency or the third operating frequency.

For example, in a first sensing mode for sensing a fingerprint, the second driving stages 320b1 to 320bk may receive the second clock signal CLKc and the second shift clock signal CLKc_b operating at a second operating frequency (e.g., 120 Hz). For example, in a second sensing mode for sensing a touch, the second driving stages 320b1 to 320bk may receive the second clock signal CLKc and the second shift clock signal CLKc_b operating at a third operating frequency (e.g., 240 Hz).

According to an embodiment of the present disclosure, design difficulty of the plurality of second driving stages 320b1 to 320bk may be reduced, and operations of the plurality of second driving stages 320b1 to 320bk may be relatively simplified compared to the embodiment shown in FIG. 11.

Figure 13:
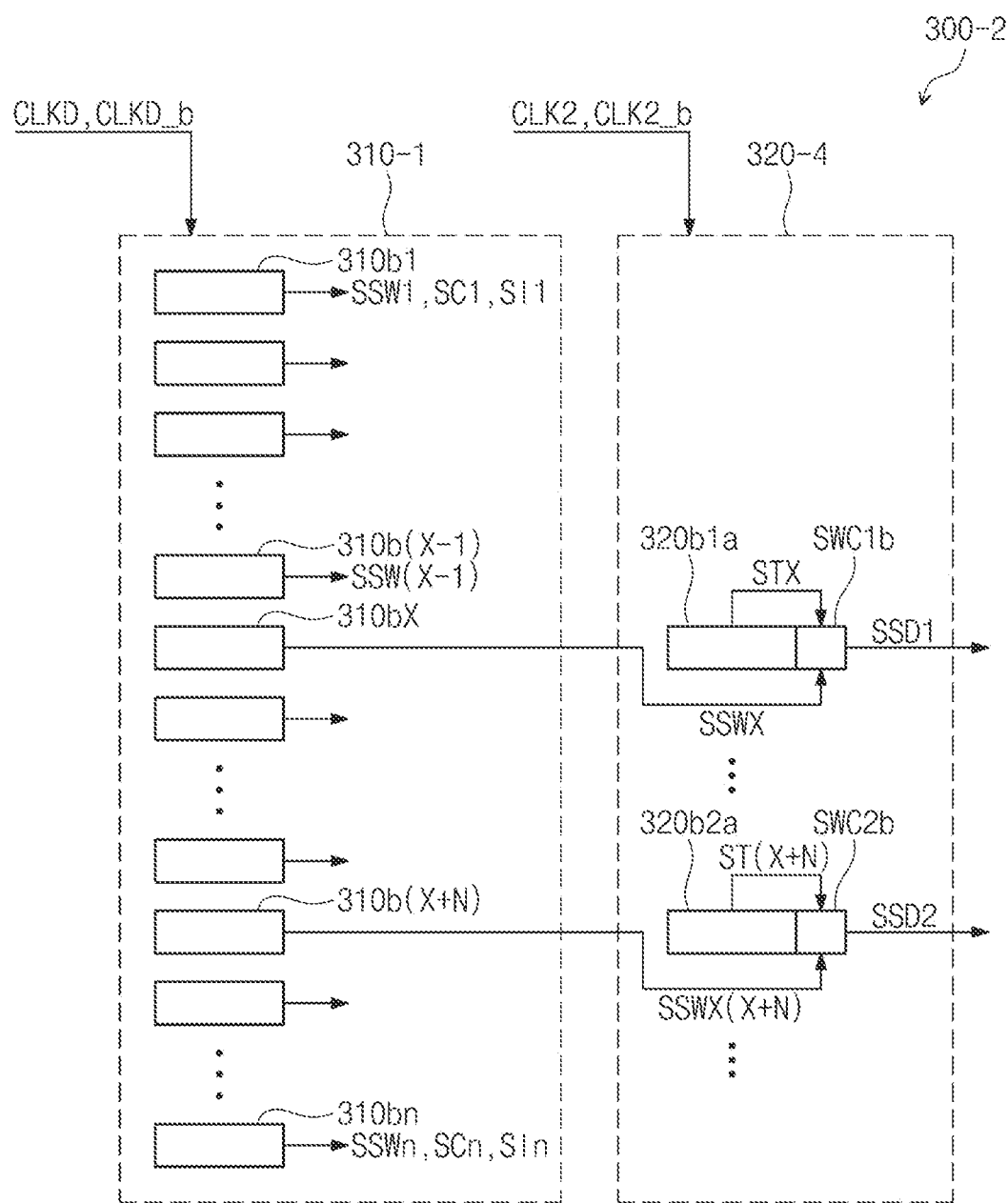
FIG. 13 is a block diagram of a scan driver, according to an embodiment of the present disclosure.
Figure 14A:
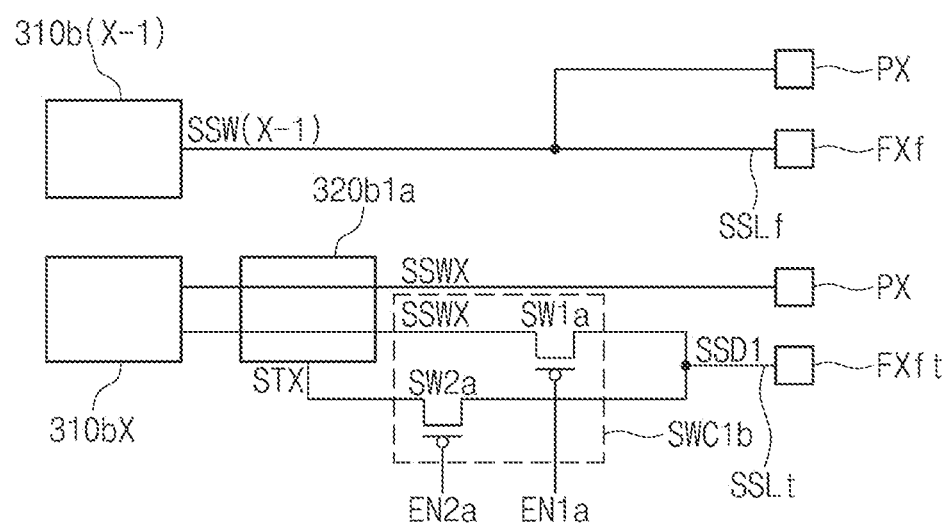
FIG. 14A is a diagram showing some configurations of the scan driver shown in FIG. 13.

FIG. 13 is a block diagram of a scan driver, according to an embodiment of the present disclosure. FIG. 14A is a diagram showing some configurations of the scan driver shown in FIG. 13.

Referring to FIGS. 13 and 14A, a scan driver 300-2 may include a first driver 310-1 and a second driver 320-4. The first driver 310-1 may include the plurality of first driving stages 310b1 to 310bn. The second driver 320-4 may include a plurality of second driving stages 320b1a and 320b2a, and a plurality of switch circuits SWC1b and SWC2b that are respectively connected to the plurality of second driving stages 320b1a and 320b2a.

The first driving stages 310b1 to 310bn may provide the initialization scan signals SI1 to SIn, the compensation scan signals SC1 to SCn, and first scan signals SSW1 to SSWn. The first scan signals SSW1 to SSWn may be provided to the pixels PX and the sensors FX (e.g., see FIG. 3). Accordingly, the first scan signals SSW1 to SSWn may be referred to as "write scan signals" or "first operation scan signals".

The plurality of switch circuits SWC1b and SWC2b may be configured to selectively output one of the first scan signals SSWX and SSW(X+N) respectively output from the first driving stages 310bX and 310b(X+N), or the second scan signals STX and ST(X+N) respectively output from the plurality of second driving stages 320b1a and 320b2a. For example, signals SSD1 and SSD2 output from the plurality of switch circuits SWC1b and SWC2b may be provided to corresponding operation scan lines.

In an embodiment, the number of the plurality of first driving stages 310b1 to 310bn may be greater than the number of the plurality of second driving stages 320b1a and 320b2a. For example, an operation scan line SSLf connected to the sensor FXf used only for fingerprint sensing may receive a first operation scan signal SSW(X-1) from the first driving stage 310b(X-1)). An operation scan line SSLt connected to the sensor FXft that operates to sense a fingerprint and touch location coordinates may receive a first scan signal SSWX (e.g., a first operation scan signal) output from the first driving stage 310bX, or may receive the second scan signal STX (e.g., a second operation scan signal) output from the second driving stage 320b1a.

FIG. 14A shows one switch circuit SWC1b. Each of the remaining switch circuits may have the same or substantially the same equivalent circuit as that of the switch circuit SWC1b shown in FIG. 14A. The switch circuit SWC1b may receive a first enable signal EN1a, a second enable signal EN2a, the first operation scan signal SSWX, and the second operation scan signal STX. The switch circuit SWC1b may include a first switch SW1a and a second switch SW2a. The first switch SW1a may be connected between the first driving stage 310bX and the operation scan line SSLt, and the second switch SW2a may be connected between the second driving stage 320b1a and the operation scan line SSLt. An operation of the first switch SW may be controlled by the first enable signal EN1a, and an operation of the second switch SW2a may be controlled by the second enable signal EN2a.

Figure 14B:
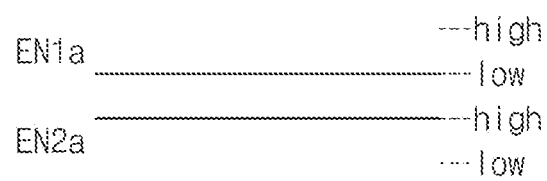
FIG. 14B is a waveform diagram illustrating an operation of the switch circuit shown in FIG. 14A in a first sensing mode.

FIG. 14B is a waveform diagram illustrating an operation of the switch circuit shown in FIG. 14A in a first sensing mode.

Referring to FIGS. 14A and 14B, in a first sensing mode for sensing a fingerprint, the first enable signal EN1a may be activated, and the second enable signal EN2a may be deactivated. The first switch SW1a and the second switch SW2a may be PMOS transistors. Accordingly, the first enable signal EN1a may have a low level, and the second enable signal EN2a may have a high level. Accordingly, the sensor FXft may receive the first scan signal SSWX output from the first driving stage 310bX as an operation scan signal.

Figure 14C:
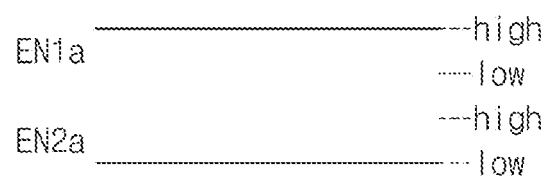
FIG. 14C is a waveform diagram illustrating an operation of the switch circuit shown in FIG. 14A in a second sensing mode.

FIG. 14C is a waveform diagram illustrating an operation of the switch circuit shown in FIG. 14A in a second sensing mode.

Referring to FIGS. 14A and 14C, in a second sensing mode for sensing an external input, the first enable signal EN1a may be deactivated, and the second enable signal EN2a may be activated. Accordingly, the sensor FXft may receive a second scan signal STX output from the second driving stage 320b1a as an operation scan signal.

According to the embodiments shown in FIGS. 13 and 14A to 14C, the first driver 310-1 may be used for image display and fingerprint sensing, and the second driver 320-4 may be used for touch sensing. In the second sensing mode for sensing coordinates by an external input, the readout circuit 500 (e.g., see FIG. 3) removes unnecessary data and may detect input coordinates by using valid data.

Figure 15:
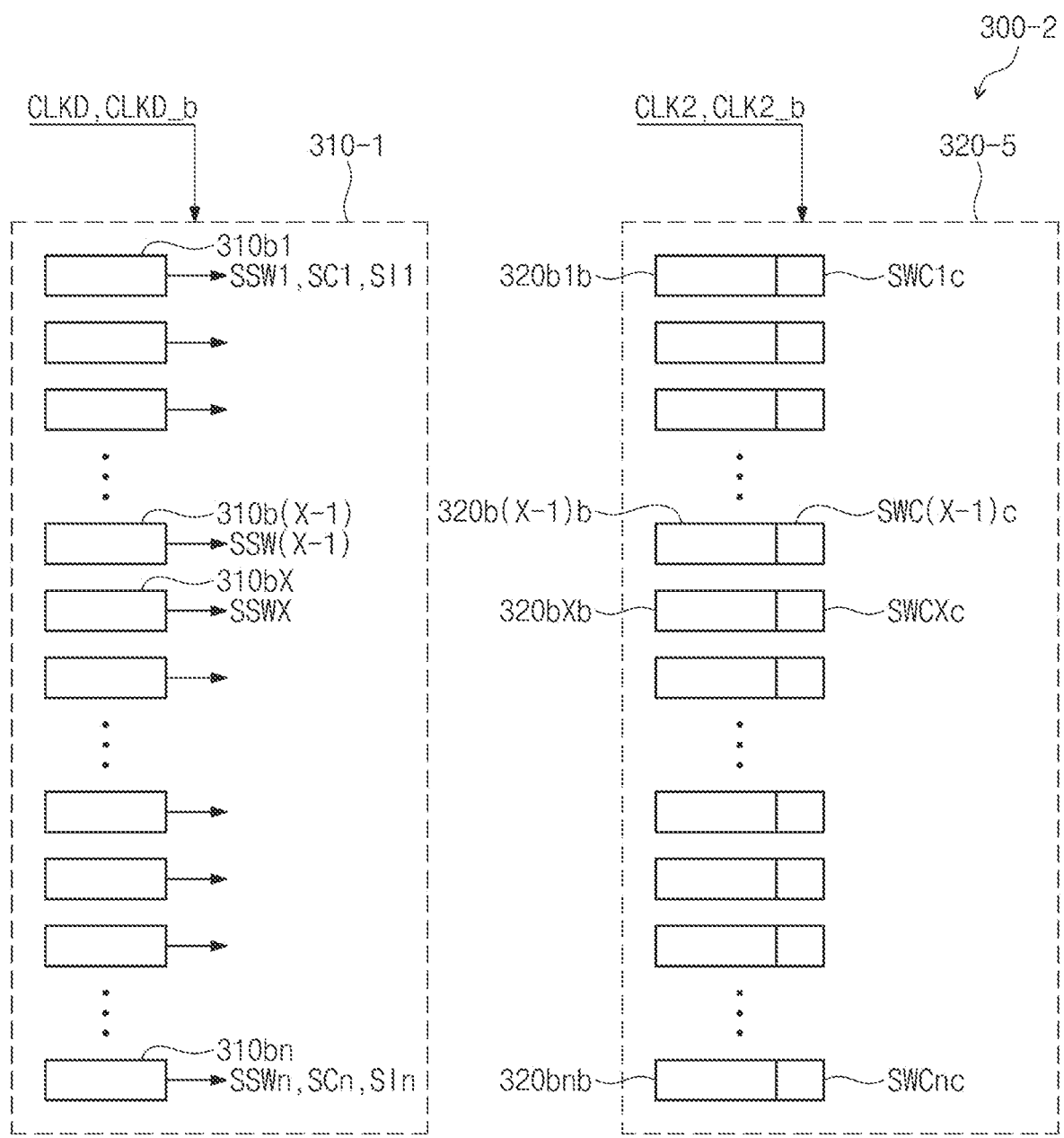
FIG. 15 is a block diagram of a scan driver, according to an embodiment of the present disclosure.
Figure 16A:
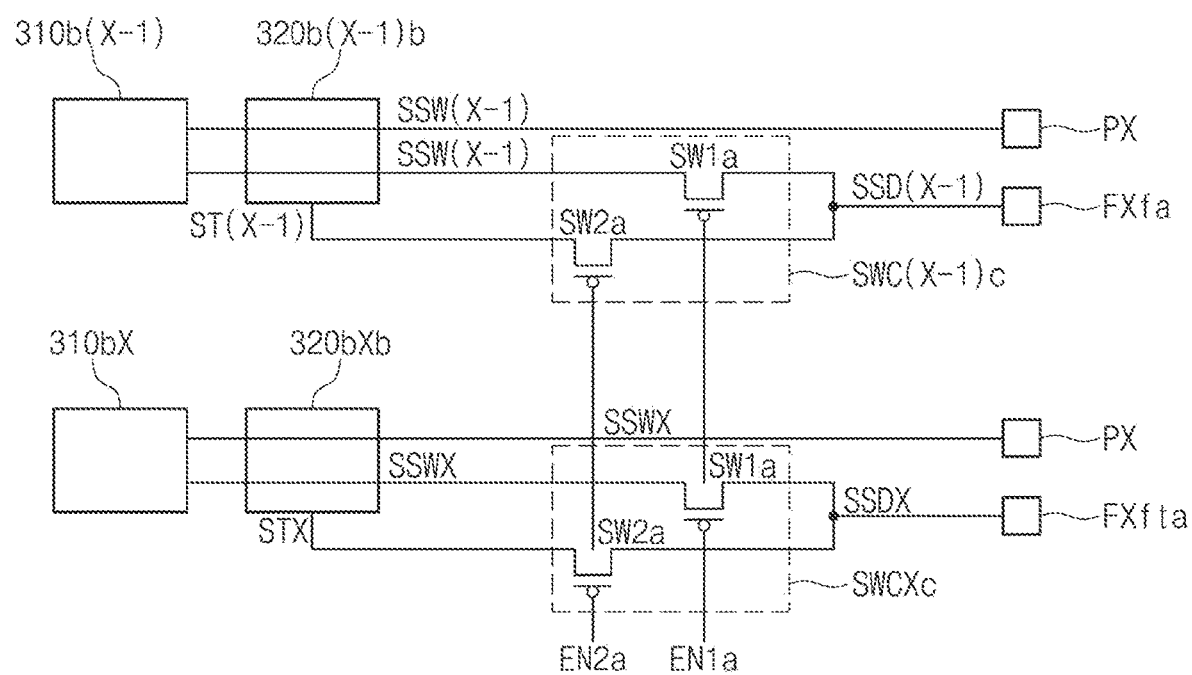
FIG. 16A is a diagram showing some configurations of the scan driver shown in FIG. 15.

FIG. 15 is a block diagram of a scan driver, according to an embodiment of the present disclosure. FIG. 16A is a diagram showing some configurations of the scan driver shown in FIG. 15. FIG. 16A illustrates two first driving stages 310b(X-1) and 310bX, two second driving stages 320b(X-1)b and 320bXb, and two switch circuits SWC(X-1)c and SWCXc.

Referring to FIGS. 15 and 16A, the scan driver 300-2 may include the first driver 310-1 and a second driver 320-5. The first driver 310-1 may include the plurality of first driving stages 310b1 to 310bn (where 'n' is a positive integer greater than or equal to 2). The second driver 320-5 may include a plurality of second driving stages 320b1b to 320bnb (where 'n' is a positive integer greater than or equal to 2), and a plurality of switch circuits SWC1c and SWCnc respectively connected to the plurality of second driving stages 320b1b to 320bnb.

In an embodiment, the number of the plurality of first driving stages 310b1 to 310bn may be equal to the number of a plurality of second driving stages 320b1b and 320bnb. Accordingly, the plurality of first driving stages 310b1 to 310bn may be electrically connected to the plurality of second driving stages 320b1b to 320bnb, respectively. According to an embodiment of the present disclosure, the switch circuits SWC(X-1)c and SWCXc are connected to all the sensors FXfa and FXfta. Accordingly, it is possible to variably utilize a sensor used for a touch.

Figure 16B:
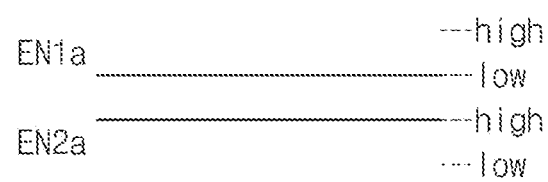
FIG. 16B is a waveform diagram illustrating an operation of the switch circuit shown in FIG. 16A in a first sensing mode.

FIG. 16B is a waveform diagram illustrating an operation of the switch circuit shown in FIG. 16A in a first sensing mode.

Referring to FIGS. 16A and 16B, in a first sensing mode for sensing a fingerprint, the first enable signal EN1a may be activated, and the second enable signal EN2a may be deactivated. The first switch SW1a and the second switch SW2a may be PMOS transistors. Accordingly, the first enable signal EN1a may have a low level, and the second enable signal EN2a may have a high level. Accordingly, sensors FXfa and FXfta may receive first scan signals SSW(X−1) and SSWX output from the first driving stages 310b(X−1) and 310bX as operation scan signals SSD(X−1) and SSDX, respectively.

Figure 16C:
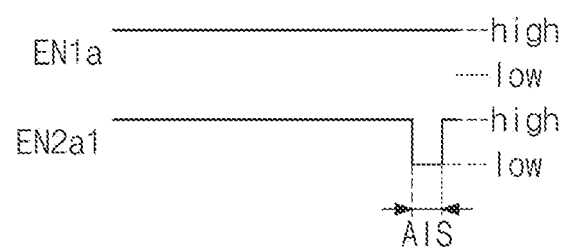
FIG. 16C is a waveform diagram illustrating an operation of the switch circuit shown in FIG. 16A in a second sensing mode.

FIG. 16C is a waveform diagram illustrating an operation of the switch circuit shown in FIG. 16A in a second sensing mode.

Referring to FIGS. 16A and 16C, in a second sensing mode for sensing an external input, the first enable signal EN1a may be deactivated, and the second enable signal EN2a1 may be activated during a certain section AIS. For example, the second enable signal EN2a1 may be activated at an operation timing of the second driving stage 320bXb connected to the sensor FXfta used to sense input coordinates of an external input. Accordingly, the sensor FXfta may receive a second scan signal STX output from the second driving stage 320bXb as an operation scan signal SSDX.

Figure 17:
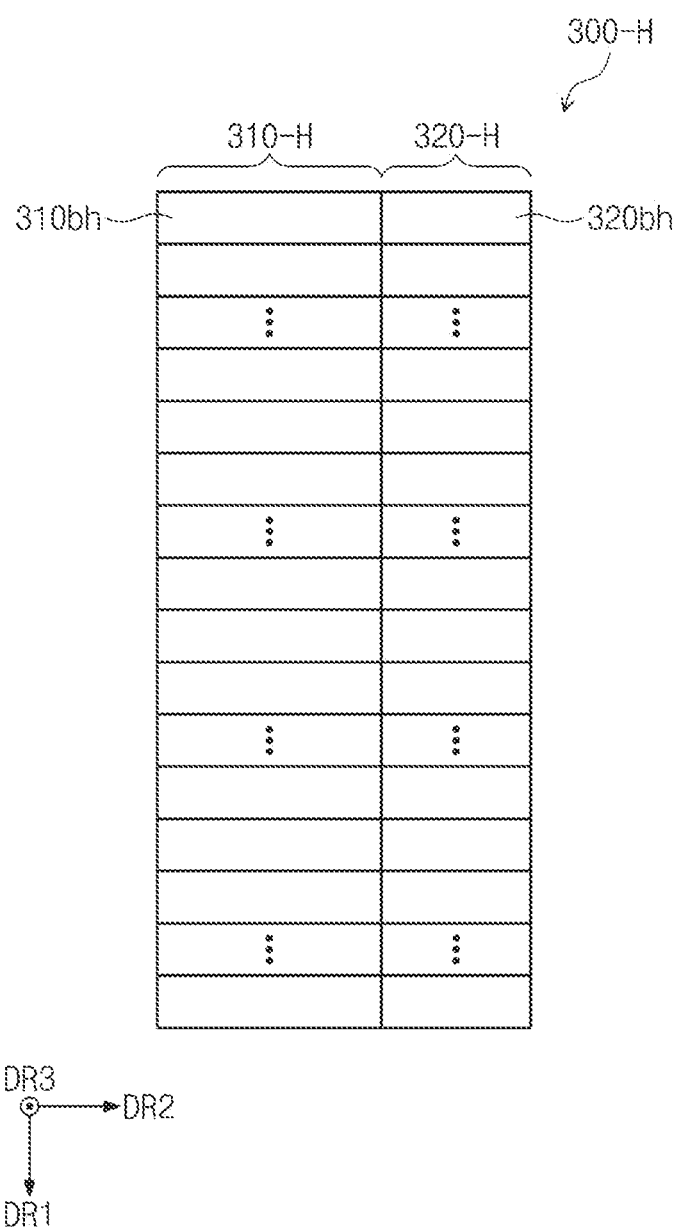
FIG. 17 is a diagram illustrating a scan driver, according to an embodiment of the present disclosure.

FIG. 17 is a diagram illustrating a scan driver, according to an embodiment of the present disclosure.

Referring to FIG. 17, a scan driver 300-H may include a first driver 310-H and a second driver 320-H. The first driver 310-H and the second driver 320-H may be adjacent to each other in the second direction DR2.

The first driver 310-H may include a plurality of first driving stages 310bh, and the plurality of first driving stages 310bh may be arranged along the first direction DR1. The second driver 320-H may include a plurality of second driving stages 320bh, and the plurality of second driving stages 320bh may be arranged along the first direction DR1.

Figure 18:
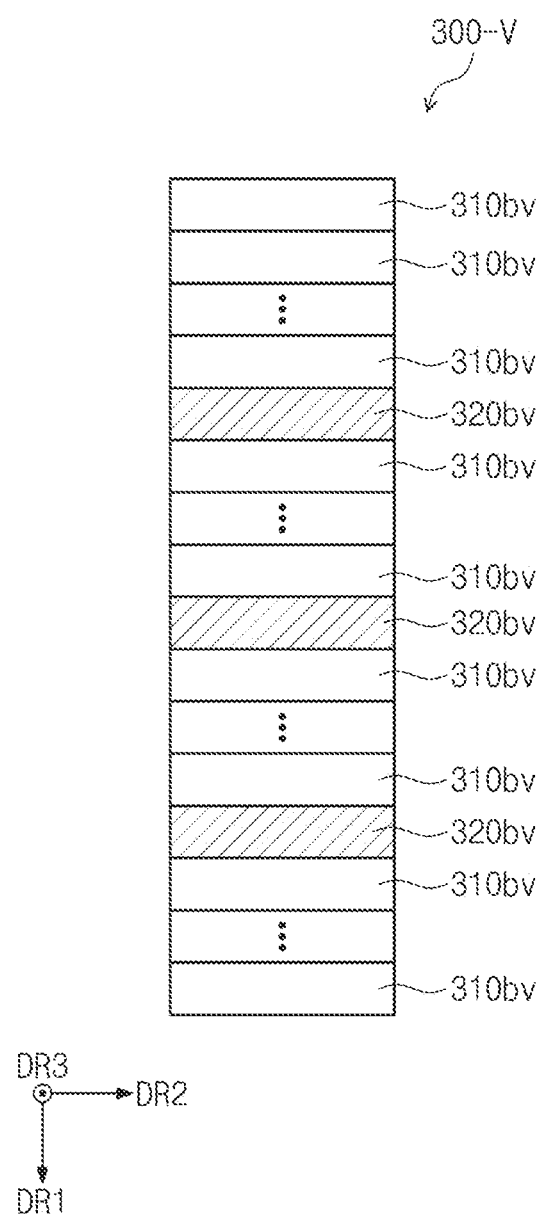
FIG. 18 is a diagram illustrating a scan driver, according to an embodiment of the present disclosure.

FIG. 18 is a diagram illustrating a scan driver, according to an embodiment of the present disclosure.

Referring to FIG. 18, a plurality of first driving stages 310bv may be arranged to be spaced from one another in the first direction DR1, and a plurality of second driving stages 320bv may be arranged in a plurality of spaces defined between the plurality of first driving stages 310bv, respectively. For example, the 'X' first driving stages 310bv may be successively arranged, one second driving stage 320bv may be arranged, the 'N−1' first driving stages 310bv may be successively arranged, and one second driving stage 320bv may be arranged.

As in the embodiment shown in FIG. 18, when the plurality of first driving stages 310bv and the plurality of second driving stages 320bv are vertically arranged along the first direction DR1, dead space may be reduced.

Figure 19A:
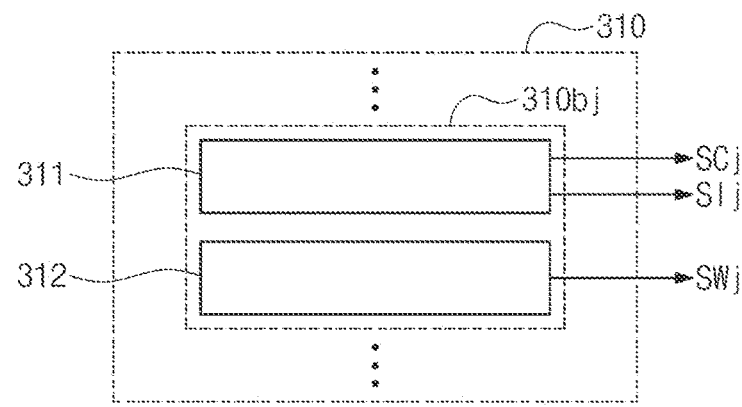
FIG. 19A is a block diagram of a first driver, according to an embodiment of the present disclosure.

FIG. 19A is a block diagram of a first driver, according to an embodiment of the present disclosure.

Referring to FIG. 19A, one first driving stage 310bj included in the first driver 310 is shown. The first driving stage 310bj may include a first scan stage 311 and a second scan stage 312. The first scan stage 311 may output the initialization scan signal Slj and the compensation scan signal SCj. The second scan stage 312 may output the write scan signal SWj. The write scan signal SWj may be referred to as a "first scan signal".

Figure 19B:
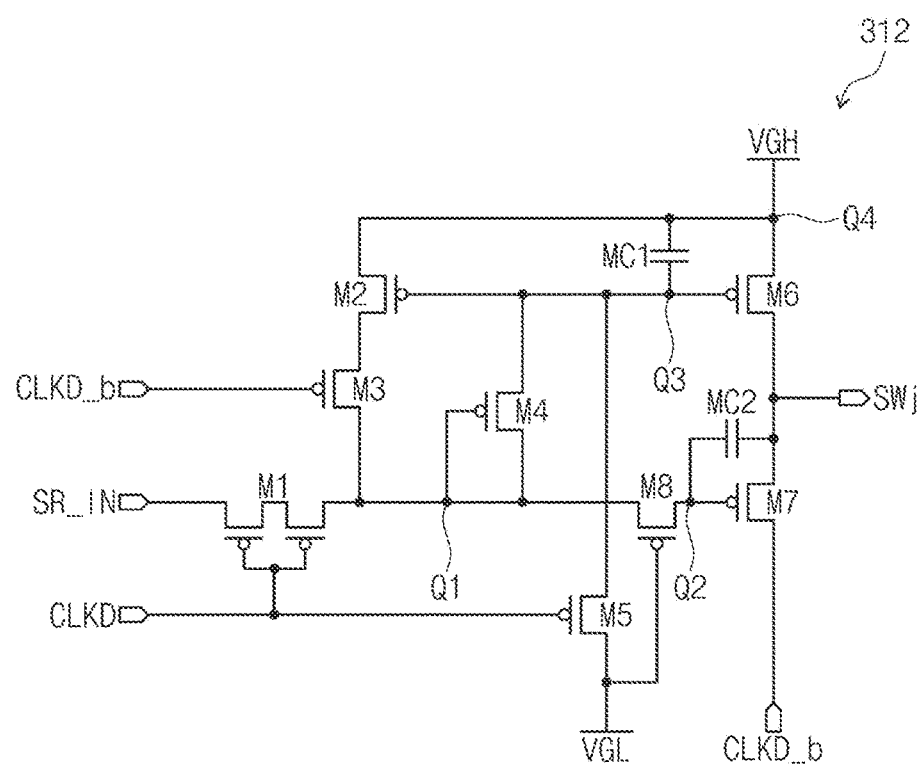
FIG. 19B is an equivalent circuit diagram of a second scan stage, according to an embodiment of the present disclosure.

FIG. 19B is an equivalent circuit diagram of a second scan stage, according to an embodiment of the present disclosure.

Referring to FIG. 19B, the second scan stage 312 may include first to eighth transistors M1, M2, M3, M4, M5, M6, M7, and M8, and first and second capacitors MC1 and MC2. A circuit configuration of the second scan stage 312 according to an embodiment of the present disclosure is not limited to that illustrated in FIG. 19B. The equivalent circuit of the second scan stage 312 shown in FIG. 19B is provided as an example, and the configuration of the second scan stage 312 may be variously modified and implemented as needed or desired.

The first transistor M1 may be referred to as a "pulse detector", the second and third transistors M2 and M3 may be referred to as a "pull-down controller", the fourth and fifth transistors M4 and M5 may be referred to as a "pull-up controller", the sixth transistor M6 may be referred to as a "pull-up unit" (e.g., a "pull-up circuit"), the seventh transistor M7 may be referred to as a "pull-down unit" (e.g., a "pull-down circuit", and the eighth transistor M8 may be referred to as a "stabilization unit" (e.g., a "stabilization circuit").

The first transistor M1 activates first and second nodes Q1 and Q2 by detecting the pulse of an input signal SR_IN in response to the clock signal CLKD. The input signal SR_IN may be a write scan signal of a previous stage.

The second and third transistors M2 and M3 initialize the first and second nodes Q1 and Q2 in response to the shift clock signal CLKD_b. The fourth and fifth transistors M4 and M5 control a third node Q3 in response to the clock signal CLKD and signals of the first and second nodes Q1 and Q2.

The sixth and seventh transistors M6 and M7 output the write scan signal SWj in response to signals from the first and second nodes Q1 and Q2 and a signal from the third node Q3. The seventh transistor M7 generates a scan pulse of the write scan signal SWj in response to the signals of the first and second nodes Q1 and Q2. One electrode of the sixth transistor M6 is connected to a fourth node Q4 provided with a first power supply voltage VGH. The sixth transistor M6 maintains the write scan signal SWj having a high state in response to the signal of the third node Q3.

The eighth transistor M8 connects the first node Q1 and the second node Q2 to each other in response to a second power supply voltage VGL. The signal of the second node Q2 may be a signal for operating the seventh transistor M7. Because the first node Q1 and the second node Q2 are connected to each other by the eighth transistor M8, the first node Q1 and the second node Q2 may be referred to as "pull-down control nodes".

The first capacitor MC1 may be connected between the third node Q3 and the fourth node Q4 to which the first power supply voltage VGH is applied. The second capacitor MC2 may be connected between the second node Q2 and a node between the sixth transistor M6 and the seventh transistor M7.

In embodiments of the present disclosure, the plurality of second driving stages 320b1 to 320bk described above with reference to FIG. 7A, the second driving stages 320bX and 320b(X+2N) to 320b(X+yN) described above with reference to FIG. 7B, the plurality of second driving stages 320b1 to 320bk described above with reference to FIGS. 11 and 12, the plurality of second driving stages 320b1a and 320b2a described above with reference to FIG. 13, and the plurality of second driving stages 320b1b to 320bnb described above with reference to FIG. 15 may have an equivalent circuit that is the same or substantially the same as (or similar to) the equivalent circuit shown in FIG. 19B. However, the present disclosure is not limited thereto, and each of the plurality of second driving stages described above may have an equivalent circuit that is different from that of the second scan stage 312 illustrated in FIG. 19B.

According to one or more embodiments, a display device may include a plurality of sensors, and may sense an external input (e.g., a user's touch), as well as biometric information, such as a fingerprint, by using the plurality of sensors. Accordingly, the display device may not include a separate input sensing layer for sensing an external input. In this case, the thickness of the display device may be further reduced. As a result, flexibility may be improved, and thus, the display device may be implemented in various suitable kinds. For example, the display device may be implemented as a foldable, rollable, or slidable display device as described above.

According to one or more embodiments, operating frequencies of the plurality of sensors may be adjusted in response to fingerprint sensing or touch sensing. For example, when a fingerprint is sensed, the plurality of sensors may be driven to sufficiently receive light during a suitable time (e.g., a predetermined time) or more for the purpose of sufficiently obtaining information based on a difference between a ridge and a valley of a fingerprint. Also, when a touch is sensed, the operating frequencies of the plurality of sensors may be increased to improve touch sensitivity.

Although some embodiments have been described, those skilled in the art will readily appreciate that various modifications are possible in the embodiments without departing from the spirit and scope of the present disclosure. It will be understood that descriptions of features or aspects within each embodiment should typically be considered as available for other similar features or aspects in other embodiments, unless otherwise described. Thus, as would be apparent to one of ordinary skill in the art, features, characteristics, and/or elements described in connection with a particular embodiment may be used singly or in combination with features, characteristics, and/or elements described in connection with other embodiments unless otherwise specifically indicated. Therefore, it is to be understood that the foregoing is illustrative of various example embodiments and is not to be construed as limited to the specific embodiments disclosed herein, and that various modifications to the disclosed embodiments, as well as other example embodiments, are intended to be included within the spirit and scope of the present disclosure as defined in the appended claims, and their equivalents.

What is claimed is:

1. An electronic device comprising a display device comprising:
    a pixel comprising a pixel driving circuit and a light emitting element;
    a sensor comprising a sensor driving circuit and a sensing element;
    a first driver configured to output a first scan signal to the pixel driving circuit; and
    a second driver configured to output a second scan signal to the sensor driving circuit,
    wherein the first driver is configured to operate at a first operating frequency, and the second driver is configured to operate at a second operating frequency or a third operating frequency.

2. The electronic device of claim 1, wherein the first driver comprises a plurality of first driving stages,
    wherein the second driver comprises a plurality of second driving stages and a plurality of switch circuits, and
    wherein each of the plurality of switch circuits is configured to control delivery of a first clock signal of the second operating frequency or a second clock signal of the third operating frequency.

3. The electronic device of claim 2, wherein each of the plurality of switch circuits comprises:
    a first switch connected to a first clock line to be provided with the first clock signal, and configured to be controlled by a first enable signal; and
    a second switch connected to a second clock line to be provided with the second clock signal, and configured to be controlled by a second enable signal.

4. The electronic device of claim 3, wherein, in a first sensing mode for sensing a fingerprint, the first enable signal is activated, and the second enable signal is deactivated, and
    wherein, in a second sensing mode for sensing an external input, the first enable signal is deactivated, and the second enable signal is activated.

5. The electronic device of claim 4, wherein the number of the plurality of second driving stages is greater than the number of the plurality of switch circuits.

6. The electronic device of claim 4, wherein the plurality of second driving stages are sequentially located along a first direction,
    wherein the plurality of switch circuits comprises:
        a first switch circuit connected to an X-th second driving stage from among the plurality of second driving stages;
        a second switch circuit connected to an (X+N)-th second driving stage from among the plurality of second driving stages; and
        a third switch circuit connected to an (X+2N)-th second driving stage from among the plurality of second driving stages, and wherein X is a constant, and N is a constant.

7. The electronic device of claim 4, wherein the number of the plurality of second driving stages is equal to the number of the plurality of switch circuits, and
    wherein the plurality of second driving stages are connected to the plurality of switch circuits, respectively.

8. The electronic device of claim 7, wherein, in the second sensing mode, the first enable signal is deactivated, and the second enable signal is activated during a section during which (X+(y*N))-th second driving stages from among the plurality of second driving stages are to operate, and
    wherein X is a constant, N is a constant, and y is an integer greater than or equal to 0.

9. The electronic device of claim 1, wherein the first driver comprises a plurality of first driving stages,
    wherein the second driver comprises a plurality of second driving stages, and
    wherein the plurality of second driving stages comprises:
        a plurality of first sensing driving stages configured to receive a first clock signal of the second operating frequency; and
        a plurality of second sensing driving stages configured to receive a second clock signal of which a frequency is changed to the second operating frequency or the third operating frequency.

10. The electronic device of claim 9, wherein at least one first sensing driving stage from among the plurality of first sensing driving stages is located between two second sensing driving stages closest to each other from among the plurality of second sensing driving stages.

11. The electronic device of claim 9, wherein the number of the plurality of first sensing driving stages is greater than the number of the plurality of second sensing driving stages.

12. The electronic device of claim 1, wherein the first driver comprises a plurality of first driving stages,
    wherein the second driver comprises a plurality of second driving stages, and
    wherein each of the plurality of second driving stages is configured to receive a clock signal of which a frequency is changed to the second operating frequency or the third operating frequency.

13. The electronic device of claim 1, wherein the first driver comprises a plurality of first driving stages, wherein the second driver comprises a plurality of second driving stages, and a plurality of switch circuits respectively connected to the plurality of second driving stages, and wherein the plurality of switch circuits are configured to selectively output one of the first scan signal output from the plurality of first driving stages or the second scan signal output from the plurality of second driving stages.

14. The electronic device of claim 13, wherein the number of the plurality of first driving stages is greater than the number of the plurality of second driving stages.

15. The electronic device of claim 13, wherein the number of the plurality of first driving stages is equal to the number of the plurality of second driving stages.

16. The electronic device of claim 13, wherein, in a first sensing mode for sensing a fingerprint, the plurality of switch circuits are configured to deliver the first scan signal output from the plurality of first driving stages, and wherein, in a second sensing mode for sensing an external input, the plurality of switch circuits are configured to deliver the second scan signal output from the plurality of second driving stages.

17. The electronic device of claim 13, wherein, in a first sensing mode for sensing a fingerprint, the plurality of switch circuits are configured to deliver the first scan signal output from the plurality of first driving stages, and wherein, in a second sensing mode for sensing an external input, the plurality of switch circuits are configured to deliver the second scan signal output from some second driving stages from among the plurality of second driving stages.

18. The electronic device of claim 1, wherein the first driver comprises a plurality of first driving stages, wherein the second driver comprises a plurality of second driving stages, wherein the plurality of first driving stages are spaced from one another along a first direction, and the plurality of second driving stages are spaced from one another along the first direction, and wherein the first driver and the second driver are spaced from each other in a second direction crossing the first direction.

19. The electronic device of claim 1, wherein the first driver comprises a plurality of first driving stages, wherein the second driver comprises a plurality of second driving stages, wherein the plurality of first driving stages are spaced from one another in a first direction, and the plurality of second driving stages are spaced from one another in the first direction, and wherein the plurality of second driving stages are respectively located in a plurality of spaces defined between the plurality of first driving stages.

* * * * *